US008266069B2

(12) United States Patent
Robinson et al.

(10) Patent No.: US 8,266,069 B2
(45) Date of Patent: Sep. 11, 2012

(54) METHOD AND APPARATUS FOR HIERARCHICAL INBOUND SHIPMENT ORDER CONFIGURATION

(75) Inventors: Evan Robinson, San Jose, CA (US); Damon Schechter, Los Angeles, CA (US)

(73) Assignee: Shipwire, Inc., Sioux Falls, SD (US)

( * ) Notice: Subject to any disclaimer, the term of this patent is extended or adjusted under 35 U.S.C. 154(b) by 641 days.

(21) Appl. No.: 12/422,167

(22) Filed: Apr. 10, 2009

(65) Prior Publication Data
US 2010/0262453 A1 Oct. 14, 2010

(51) Int. Cl.
*G06Q 30/00* (2012.01)
*G06Q 10/00* (2012.01)
(52) U.S. Cl. .......................................... 705/332; 705/28
(58) Field of Classification Search .................. 705/332, 705/28
See application file for complete search history.

(56) References Cited

U.S. PATENT DOCUMENTS

| 6,642,946 | B1 * | 11/2003 | Janes et al. ................... 715/854 |
|---|---|---|---|
| 6,721,762 | B1 | 4/2004 | Levine et al. |
| 6,876,958 | B1 | 4/2005 | Chowdhury et al. |
| 7,173,530 | B2 | 2/2007 | Lambright et al. |
| 2002/0004724 | A1 * | 1/2002 | Eastman ........................... 705/1 |
| 2002/0174038 | A1 | 11/2002 | Chien |
| 2003/0018513 | A1 * | 1/2003 | Hoffman et al. ................ 705/10 |
| 2004/0193502 | A1 * | 9/2004 | Heitner et al. .................. 705/26 |
| 2005/0289020 | A1 * | 12/2005 | Bruns et al. ..................... 705/28 |
| 2006/0020529 | A1 * | 1/2006 | Chao et al. ...................... 705/35 |
| 2007/0174146 | A1 * | 7/2007 | Tamarkin et al. ............... 705/28 |
| 2007/0192715 | A1 * | 8/2007 | Kataria et al. ................ 715/764 |
| 2007/0295808 | A1 * | 12/2007 | Tamarkin et al. ............. 235/385 |
| 2008/0133659 | A1 | 6/2008 | Aldrey et al. |

OTHER PUBLICATIONS

PCT International Search Report and Written Opinion for PCT/US10/30632, mailed Jun. 7, 2010, 12 pages.

* cited by examiner

*Primary Examiner* — Kevin Flynn
(74) *Attorney, Agent, or Firm* — Blakely, Sokoloff, Taylor & Zafman LLP

(57) ABSTRACT

An interactive hierarchical inbound shipment order configuration tool receives input from merchants to configure hierarchical inbound shipment orders. The tool allows merchants to configure hierarchical shipments with multiple levels including a product level, one or more container levels, and a shipment transportation level. The tool allows merchants to perform the following: include product type objects in the product level representing physical products and container objects in the container level(s) representing physical containers; create associations between the product type object(s) and container object(s) at the container level(s) each representing a number of products packaged into a number of containers; create associations between container object(s) at different container levels each representing a number of containers packaged into a number of containers; and create associations between the container object(s) and a shipment transportation object at the shipment transportation level each representing a number of containers included on a shipment transportation vehicle.

27 Claims, 29 Drawing Sheets

1330

| | | | |
|---|---|---|---|
| 1. | Count 1 x MIX1, and enter into inventory |  1 x MIX1 | NEW INVENTORY:<br>1 x MIX1 |
| 2. | Count 1 x MIX2, and enter into inventory |  1 x MIX2 | NEW INVENTORY:<br>1 x MIX1<br>1 x MIX2 |

1. Pull 1 x MIX1       1 x MIX1

2. Break 1 x MIX1 into 30 x PRODUCTA            NEW INVENTORY:
30 x PRODUCTA

3. Break 1 x MIX1 into 30 x PRODUCTB            NEW INVENTORY:
30 x PRODUCTA
30 x PRODUCTB

1650

METHOD AND APPARATUS FOR HIERARCHICAL INBOUND SHIPMENT ORDER CONFIGURATION

BACKGROUND

1. Field

Embodiments of the invention relate to the field of inbound shipment processing; and more specifically, to configuration of inbound shipment orders.

2. Background

Merchants commonly ship their goods (inbound shipments) to one or more warehouses in different geographic locations. These warehouses store the goods of the merchants until receiving a shipping order (outbound shipping) from the merchant instructing the warehouse to ship the goods. Commonly, the merchant packages their goods in multiple containers when shipping to the warehouses. For example, if the merchant sells widgets, the merchant may package multiple ones of these widgets in one or more containers prior to shipping them to the warehouse. Upon receipt, the warehouse breaks down the different containers to find the goods for shipping and stores these goods.

The merchants typically configure an inbound shipment order for each inbound shipment to a warehouse. Each inbound shipment order typically includes a packing list for the warehouse that lists the goods that the merchant wants to ship to customers. The warehouse typically uses the packing list when handling the corresponding inbound shipment (e.g., when unloading the inbound shipment). However, typically the inbound shipment order does not include instructions on how to locate those goods in the inbound shipment. As the package configuration of the inbound shipment becomes more complicated (e.g., goods being packaged in multiple or nested containers), the chance of the merchant making a mistake in the configuration of the inbound shipment order (e.g., providing the wrong level of shippable good) and the chance of the warehouse making a mistake in unpacking the corresponding inbound shipment (e.g., opening the wrong containers, etc.) increase.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
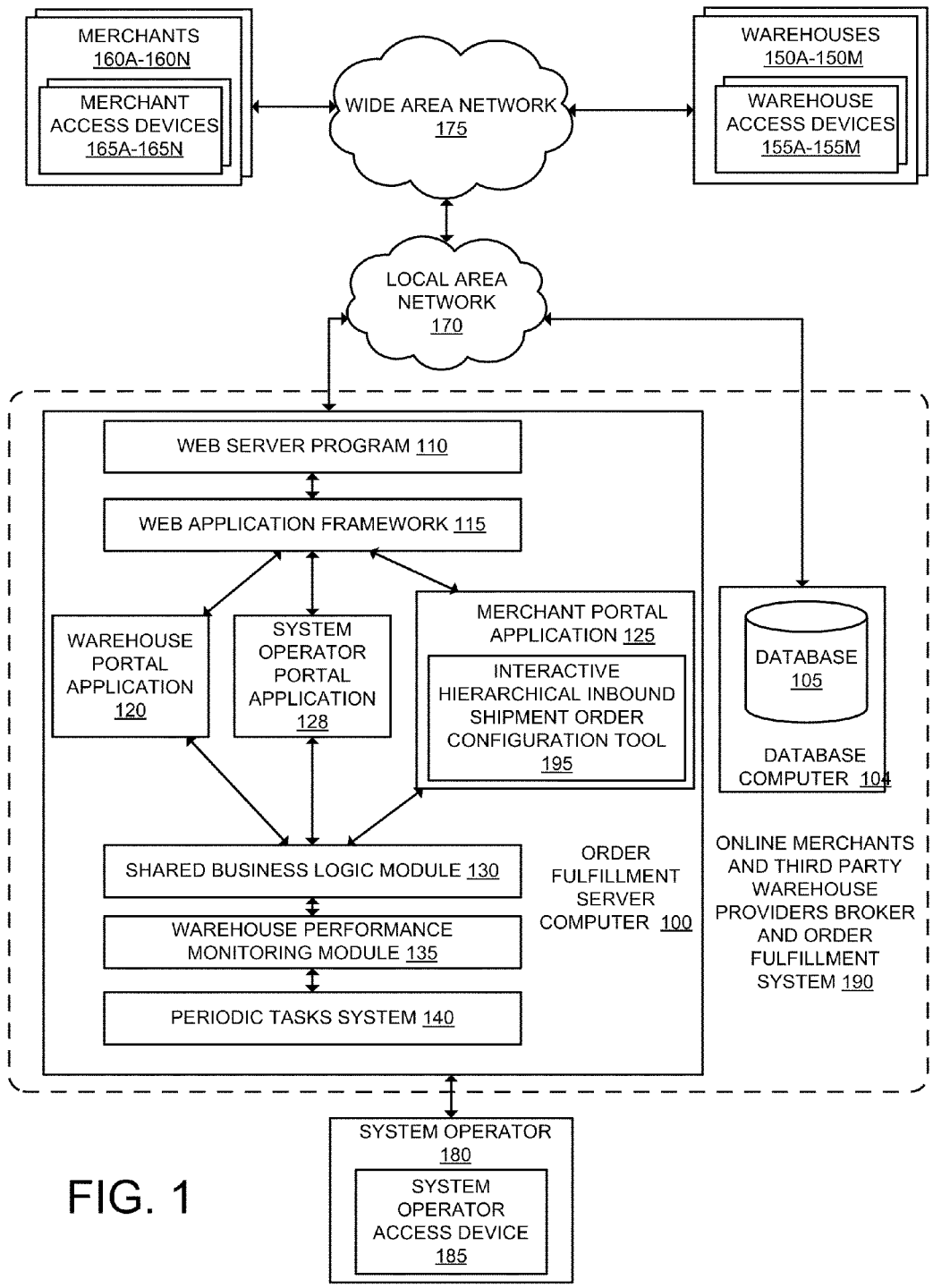
FIG. 1 illustrates an online merchants to third party warehouse providers broker and order fulfillment system coupled with multiple merchants and multiple, different, warehouses according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more computing devices (e.g., an order fulfillment server, access devices, etc.). Such computing devices store and communicate (internally and/or with other electronic devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as a storage device, one or more user input/output devices (e.g., a keyboard, a touchscreen, and/or a display), and a network connection. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

A method and apparatus for configuring hierarchical inbound shipment orders is described. In one embodiment, an interactive hierarchical inbound shipment order configuration tool is provided to online merchants to configure their inbound shipments that include multiple levels (e.g., products being packaged in containers which are themselves packaged in different container(s), etc.). The interactive hierarchical inbound shipment order configuration tool is a graphical user interface (GUI) tool that allows the merchants to graphically mirror the hierarchy of their inbound shipment when configuring their inbound shipment order. A packing list generation module generates a packing list and a graphical representation of the hierarchy of the inbound shipment for a warehouse based on the information gathered from the interactive hierarchical inbound shipment order configuration tool. In some embodiments, the packing list generation module also generates step-by-step instructions for the warehouse to handle the receipt of the hierarchical inbound shipment (e.g., which containers to break open and inventory the contents, which containers to leave alone, etc.).

FIG. 1 illustrates an online merchants to third party warehouse providers broker and order fulfillment system (hereinafter "order fulfillment system") 190 including an order fulfillment server 100 coupled with the merchant access devices 165A-165N of the merchants 160A-160N, the system operator access device 185, and the warehouse access devices 155A-155M of the different warehouses 150A-150M. The order fulfillment system 190 includes an order fulfillment server computer 100 that provides an environment for executing software programs and a database computer 104 that provides a database 105 for storage of data. The order fulfillment server computer 100 and database computer 104 are operatively connected to a local area network 170 that supports communication between the database computer 104 and the order fulfillment server computer 100. In one embodiment of the invention, the database computer 104 is configured in such a manner as to restrict communication to the order fulfillment server computer 100 alone. Although the order fulfillment server computer 100 and the database computer 104 are illustrated as being separate, in one embodiment of the invention the order fulfillment server computer 100 and the database computer 104 are implemented on the same device.

The local area network 170 is also operatively coupled with a wide area network 175 (e.g., the Internet). The local area network 170 and wide area network 175 cooperate to provide the order fulfillment server computer 100 with communication with a plurality of merchant access devices 165A-165N and a plurality of warehouse access devices 155A-155M connected to the wide area network 175.

The plurality of merchant access devices 165A-165N are operated by the plurality of online merchants 160A-160N respectively. As used herein, online merchants (hereinafter referred to as "merchants") sells products through online marketplaces and stores those products in one or more warehouses until they are purchased. For example, the merchants 160A-160N are each online merchants that store their goods in one or more warehouses until they are ready to be shipped to buyers. In some embodiments of the invention, each of the merchants 160A-160N do not own, operate, or control their own warehouse(s) (thus the warehouses are third party warehouses). Similarly, in some embodiments of the invention the warehouses 150A-150M are not owned, operated, or controlled by the owner/operators of the order fulfillment server 100.

According to one embodiment of the invention, the merchant access devices 165A-165N are computing devices operatively coupled to the wide area network 175, and each connect and use the merchants and warehouses broker and order fulfillment system 190 (e.g., through a web browser program, text messages, email messages, etc.), which will be described in greater detail later herein.

The plurality of warehouse access devices 155A-155M are operated by clients of the plurality of warehouses 150A-150M respectively. A warehouse client is a warehouse provider of one or more of the warehouses 150A-150M that provides services (e.g., storage, shipping, and other related services) for one or more of the merchants 160A-160N. For example, each warehouse client operates or controls one or more of the warehouses 150A-150M. At least some of the warehouses 150A-150M are located in different geographic locations (e.g., including within, and outside of, the United States). In addition, each of the warehouses 150A-150M may have different capabilities (e.g., storage capabilities, technical capabilities, etc.), and thus, at least some are different. For example, some of the warehouses 150A-150M may have the ability to store frozen goods while others may not.

The warehouse access devices 155A-155M are computing devices operatively coupled to the wide area network 175, and each connect and use the merchants and warehouses broker and order fulfillment system 190 (e.g., through a web browser program, text messages, email messages, or other forms of communication), which will be described in greater detail later herein. For example, the warehouse access devices 155A-155M may include desktop computers, workstations, laptops, palmtops, smartphones, warehouse inventory scanners, etc.

The system operator access device 185 is operated by the system operator 180. The system operator 180 is an administrator of the order fulfillment system 190 and may act as mediator between the merchants 160A-160N and the warehouses 150A-150M. The system operator 180 also supervises the performance of the warehouses 150A-150M and may intervene when exceptions arise in normal system operation.

In some embodiments of the invention, the merchants 160A-160N do not directly retain the services of the warehouses 150A-150M (that is, the merchants 160A-160N do not enter into any contracts with the warehouses 150A-150M). The order fulfillment server 100 may broker warehouse space in the warehouses 150A-150M on behalf of the merchants 160A-160N on space previously leased. For example, the merchants and warehouses broker and order fulfillment system 190 has leased space in the warehouses 150A-150M and that space may be used to store the goods of the merchants 160A-160N. In one embodiment of the invention, the merchants 160A-160N ship their goods to a location specified with the merchants and warehouses broker and order fulfillment system 190 (which may or may not reveal/specify the actual warehouse that will store the their goods), and those goods are shipped selectively to the specified ones of the warehouses 150A-150M. The entity that ships the goods to the warehouses 150A-150M may be different in different embodiments of the invention (e.g., the goods may be shipped directly by the merchants 160A-160N to the warehouses 150A-150M, or the merchants and warehouses broker and order fulfillment system 190 may cause the goods to be shipped to the warehouses 150A-150M). In one embodiment of the invention, the merchants 160A-160N are not aware of which of the warehouses their goods are ultimately stored at.

As used herein, the term "inbound shipment" refers to the shipment from the merchants 160A-160N to the warehouses 150A-150M (directly or indirectly), as opposed to the term "shipping order" (or "outbound shipping order"), which refers to the shipment of goods from the warehouses 150A-150M to the buyer(s) of those goods (typically through different common carriers servicing those warehouses 150A-150M).

The order fulfillment server computer 100 includes different modules that allow the merchant access devices 165A-165N, the warehouse access devices 155A-155M, and the system operator access device 185 to use the services of the order fulfillment system 190. The order fulfillment server computer 100 includes the web server program 110, the web application framework 115, the warehouse portal application 120, the merchant portal application 125, the system operator portal application 128, the shared business logic module 130, the warehouse performance monitoring module 135, and the periodic tasks system 140.

The web server program 110 is configured to run on the order fulfillment server computer 100 and allows the order fulfillment server computer 100 to accept connections and requests communicated by the merchant access devices 165A-165N and the warehouse access devices 155A-155M connected to the wide area network 175. In one embodiment of the invention, the order fulfillment server computer 100 restricts with whom the order fulfillment server computer 100 may communicate to a predetermined list of authorized devices. The web server program 110 provides an environment for executing a plurality of additional software programs which can process accepted device requests as input to the additional software programs, returning the additional software programs' output as a response to the requesting device. The web server program 110 is configured to execute the web application framework 115 and to send all accepted requests as input to the web application framework 115.

The web application framework 115 is an additional software program which is installed on the order fulfillment server computer 100 in such a manner that it can be executed by the web server program 110. The web application framework 115 processes requests passed from the web server program 110 and determines which additional software program must be executed next in order to respond to a request. The web application framework 115 reads passed input from the web server program 110 and executes the warehouse portal application 120, executes the merchant portal application 125, or terminates. If the web application does not terminate, it passes the request it is processing to the next program executed (to either the warehouse portal application 120 or the merchant portal application 115).

The warehouse portal application 120 is an additional software program which is installed on the order fulfillment server computer 100 in such a manner that it can be executed by the web server program 110. The warehouse portal application 120 is used by the warehouses 150A-150M and allows each of the warehouses 150A-150M to communicate with the order fulfillment server computer 100 in a common way.

The merchant portal application 125 is an additional software program which is installed on the order fulfillment server computer 100 in such a manner that it can be executed by the web server program 110. The merchant portal application 125 is used by the merchants 160A-160N to communicate requests to and receive request status from the warehouses 150A-150M which will be described in greater detail later herein. The merchant portal application 125 includes the interactive hierarchical inbound shipment order configuration tool 195, which will be described in more detail later herein.

The system operator portal application 128 is an additional software program which is installed on the order fulfillment server computer 100 in such a manner that it can be executed by the web server program 110. The system operator portal application 128 is used by the system operator 180 to manage the warehouses 150A-150M which will be described in greater detail later herein.

The merchant access devices 165A-165N are configured to accept as input the wide area network 175 address of the order fulfillment server computer 100 and to make connections to the order fulfillment server computer 100 at said address for the purpose of sending requests on behalf of the merchants 160A-160N. The address of the order fulfillment server computer 100 is made known to the merchants 160A-160N who provide the address as input to the merchant access devices 165A-165N. The merchants 160A-160N control the merchant access devices 165A-165N for purposes of sending requests to, and receiving responses from, the merchant portal application 125.

Analogously, the warehouse access devices 155A-155M are configured to send requests to, and receive responses from, the warehouse portal application 120 on behalf of the warehouses 150A-150M.

Analogously, the system operator access device 185 is configured to send requests to, and receive responses from, the system operator portal application 128 on behalf of the system operator 180.

The periodic tasks system 140 is installed on the order fulfillment server computer 100 and executes a plurality of periodic tasks. For example, the periodic tasks system 140 executes processes of the warehouse performance monitoring module 135 for the purpose of monitoring performance of the warehouses 150A-150M.

The warehouse performance monitoring module 135 includes processes for the purpose of monitoring performance of the warehouses 150A-150M. For example, the warehouse performance monitoring module 135 periodically collects performance metrics from the warehouses 150A-150M. The performance metrics may be stored in the database 105, and may be accessible by the system operator portal application 128 and the warehouse portal application 120.

The shared business logic module 130 is additional software which is installed on the order fulfillment server computer 100 and provides library functions to the warehouse portal application 120, the merchant portal application 125, the system operator portal application 128, the warehouse performance monitoring module 135, and the periodic tasks system 140.

The database 105 provides a system for storage and retrieval of data related to objects considered by the warehouses 150A-150M in the course of performing services for the merchants 160A-160N, and data related to the merchants 160A-160N that is used by those merchants 160A-160N when they use the merchants and warehouses broker and order fulfillment system 190.

Figure 2:
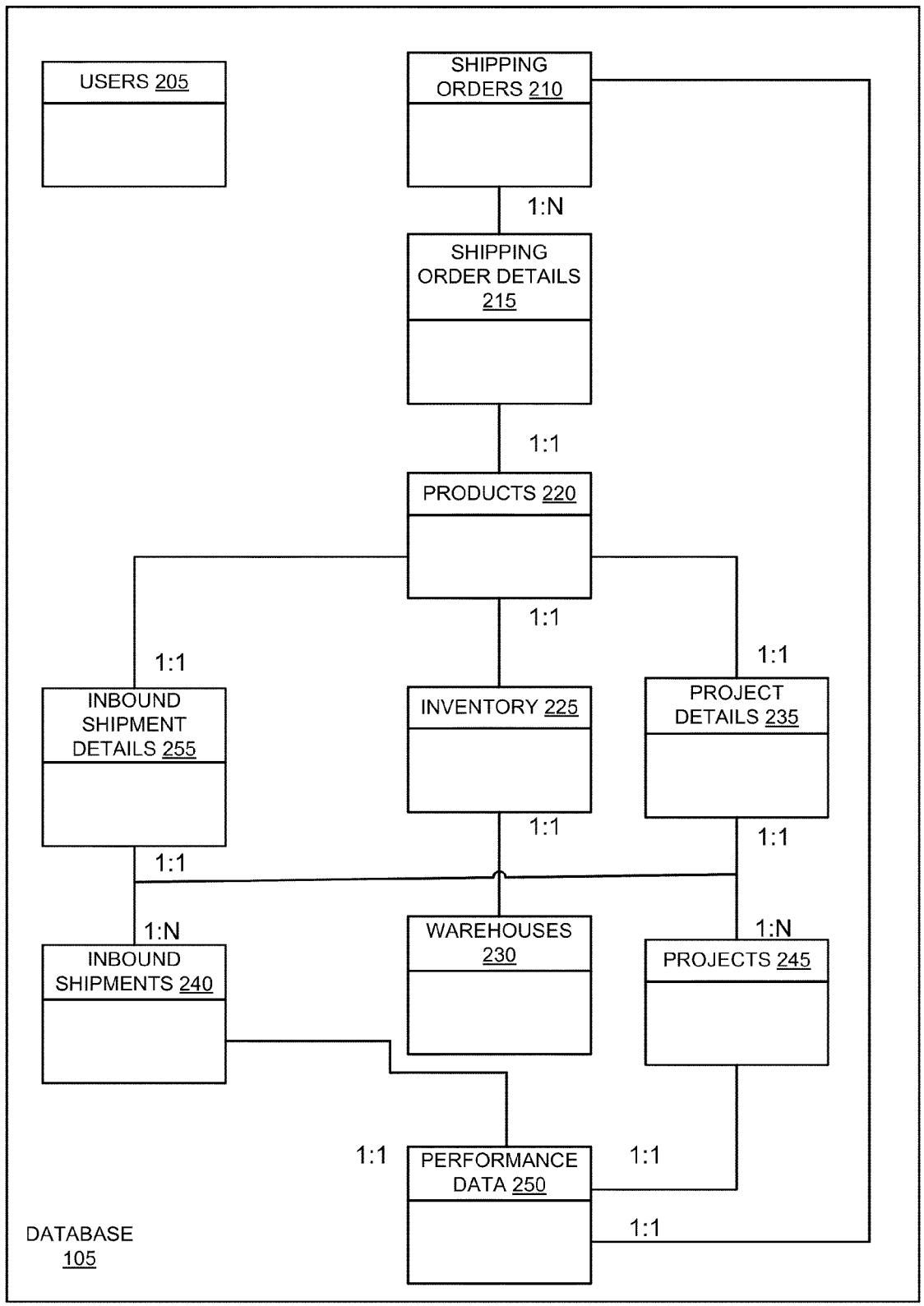
FIG. 2 illustrates an exemplary embodiment of a database used in the online merchants to third party warehouse providers broker and order fulfillment system of FIG. 1 according to one embodiment of the invention.

FIG. 2 is an exemplary embodiment of the database 105 according to one embodiment of the invention. As illustrated in FIG. 2, the database 105 is organized into tables and rows. While a single database has been illustrated, it should be understood that multiple databases may be used in embodiments of the invention (e.g., one or more databases for merchant related data and one or more databases for warehouse related data, each warehouse and/or each merchant may have their own database, etc.).

A product table 220 is provided for storing data regarding specific products that the merchants 160A-160N sell and need to be stored by one or more of the warehouses 150A-150M. As previously described, each of the warehouses 150A-150M may have different storage capabilities and each may not be able to store all products. According to one embodiment of the invention, the product table 220 includes a plurality of data rows, each row including an auto-incrementing integer primary key, stock keeping unit (SKU), product description, product length in inches, product width in inches, product height in inches, product weight in pounds, product wholesale cost in dollars, product and retail cost in dollars.

A warehouse table 230 is provided for storing data regarding properties and capabilities of the warehouses 150A-150M. The warehouse table 230 includes a plurality of data rows, each row including an auto-incrementing integer primary key, warehouse name, street address, city, region, country, geographic latitude, geographic longitude, phone number, contact e-mail address, shipping order execution price per item, inbound shipment execution price per item, and storage price per unit volume.

An inventory table 225 is provided for storing data regarding available product stock for a given product for a given merchant spread across one or more of the warehouses 150A-150M. The inventory table 225 includes a plurality of rows, each row including a composite natural key referring to the related SKU and the related warehouse 150A-150M, pending inbound count, good count, backordered count, allocated count, shipping count, shipped count, returned count, consuming count (the count of this product that is being used in a pending project), and creating count (the count of this product that will be created by a pending project). According to one embodiment of the invention, the inventory table 225 is updated in real time responsive to a shipping order being received by the merchants and warehouses broker and order fulfillment system 190.

An inbound shipment table 240 is provided for storing data regarding inbound shipments that have been arranged to arrive at the warehouses 150A-150M. The inbound shipment table 240 includes a plurality of rows, each row including an auto-incrementing integer primary key, a unique transaction identifier, the date of the inbound shipment's entry into the database 105, the inbound shipment's destination warehouse identifier, the inbound shipment's expected arrival date, the inbound shipment's carrier, the inbound shipment's tracking number, the last time the inbound shipment was able to be tracked, the date when the inbound shipment information was last transmitted to the warehouse, the time at which the inbound shipment was reported complete (e.g., received at the appropriate warehouse and reported as complete), and an auto-incrementing integer revision number representing the number of times that information about the inbound shipment has been edited.

An inbound shipment details table 255 is provided for storing data regarding the specific products and quantities of products that are expected in an inbound shipment. The inbound shipment details table 255 includes a plurality of rows, each row including an auto-incrementing integer primary key, the related product's identifier, the expected quantity, a count of outstanding pending quantity, and a count of received-to-date quantity.

A shipping order table 210 is provided for storing data regarding shipping orders which the merchants 160A-160N wishes for the warehouses 150A-150M to process. The shipping order table 210 includes a plurality of rows, each row including an auto-incrementing integer primary key, a unique transaction identifier, the date of the shipment's entry into the database 105, the shipment's consignee name, street address, city, state, region, postal code, country; the shipment's desired carrier, the shipment's tracking number, the time when the shipment information was transmitted to the warehouse, the time at which the order was reported shipped by the warehouse, the last time the order was able to be tracked, the shipment status at the last time the order was able to be tracked, the time the order was reported delivered, the time the order was reported returned, and the salability status of the order at the time of return.

A shipping order details table 215 is provided for storing data regarding the specific products and quantities of products that the merchants 160A-160N wishes to ship. The shipping order details table 215 includes a plurality of rows, each row including an auto-incrementing integer primary key, the related product's identifier, the expected quantity, a count of backordered quantity, a count of allocated quantity, a count of shipping quantity, a count of shipped-to-date quantity, and a count of returned-to-date quantity.

A project table 245 is provided for storing data regarding special projects which the merchants 160A-160N wishes for the warehouses 150A-150M to perform on products. A special project involves working on the inventory that is not strictly included in shipping or receiving. The following are examples of special projects: applying price tags to items in preparation for distribution to retailers; combining multiple single SKUs (stock keeping units) to form a new combined SKU (i.e., kitting); opening a container SKU and inventorying its contents (i.e., breaking down a lot); preparing a large shipment for freight pickup; adding labels to the products; photographing the inventory; measuring the inventory; and disposing of inventory. The project table 245 includes a plurality of rows, each row including an auto-incrementing integer primary key, the kind of work requested, the labor cost estimate provided by the warehouse 140, the completion date estimate provided by the warehouse 140, the actual labor cost provided by the warehouse 140 upon project completion, the actual project completion date, and the project's current status.

A project details table 235 is provided for storing data regarding the specific products and quantities of products that are involved in a special project. The project details table 235 includes a plurality of rows, each row including an auto-incrementing integer primary key, the related product identifier, the expected quantity of product to be consumed, the count of outstanding unconsumed product, the expected quantity of product to be created, and the count of outstanding uncreated product.

A user table 205 is provided for storing data regarding permitted users of the merchant portal application 125 (e.g., the permitted merchants 160A-160N), the warehouse portal application 120 (e.g., the permitted warehouses 150A-150M), and the system operator portal application 128 (e.g. the system operator 180). The user table 505 comprises a plurality of rows, each row comprising an auto-incrementing integer primary key, the username, an encrypted representation of a password credential, a user type indicator of whether the user represents a merchant, warehouse, or system operator, and which one or more of the warehouses 150A-150M with which the user is associated.

Figure 3:
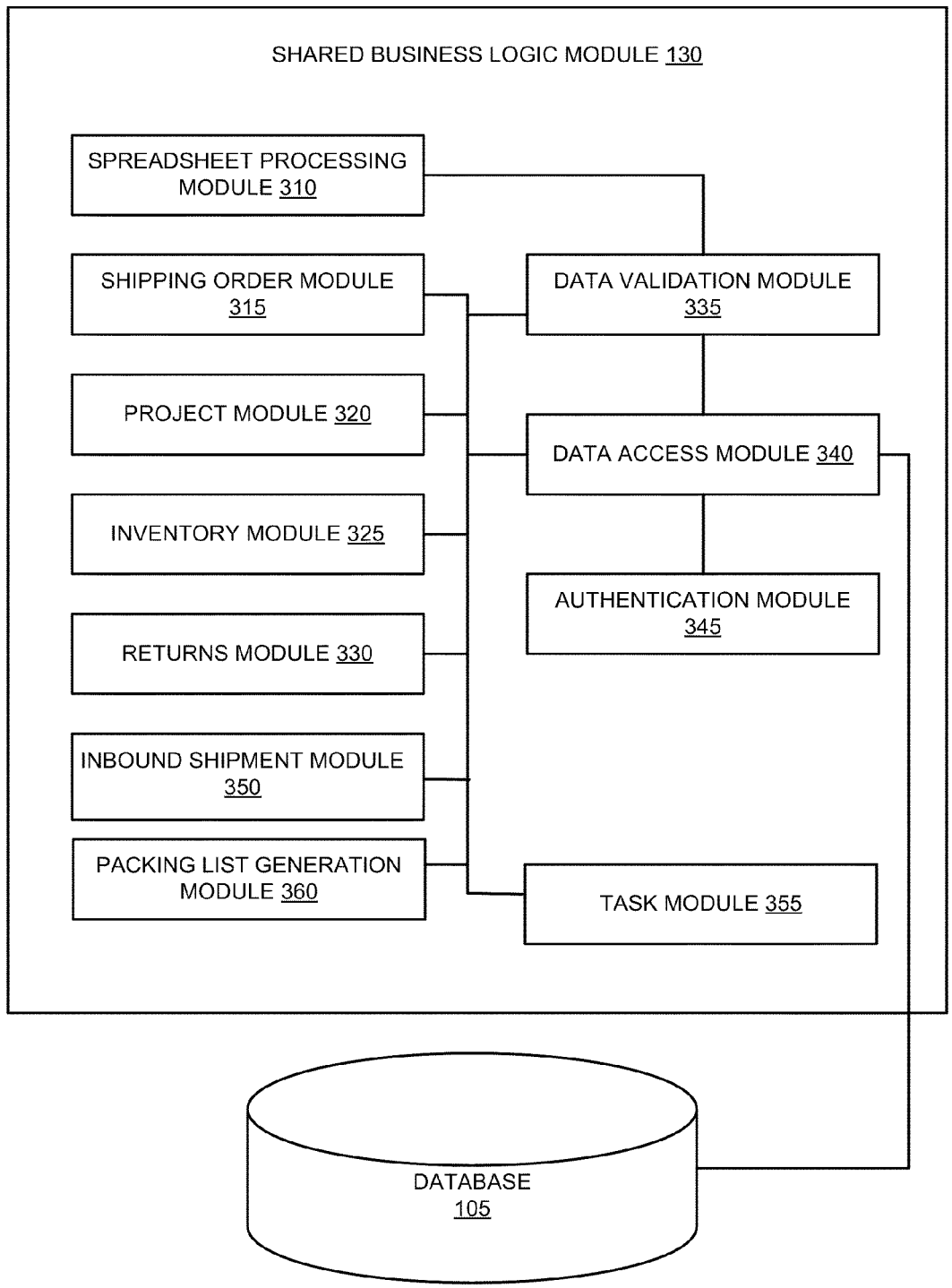
FIG. 3 illustrates a detailed view of an exemplary shared business logic module used in the online merchants to third party warehouse providers broker and order fulfillment system of FIG. 1 according to one embodiment of the invention.

FIG. 3 is a detailed view of an exemplary shared business logic module 130 according to one embodiment of the invention. With reference to FIG. 3, the shared business logic module 130 includes a library of functional program subroutines invoked by higher application layers to coordinate operations on the objects in the database 105. The shared business logic module 130 includes a spreadsheet processing module 310, a shipping order module 315, a project module 320, an inventory module 325, a returns module 330, a data validation module 335, a data access module 340, an authentication module 345, an inbound shipment module 350, a task module 355, and a packing list generation module 360.

The data access module 340 provides subroutines for performing basic creation, read, update, and delete operations on data in the tables of database 105. These operations are effected by adapting and transforming library function parameters and inputs to the input requirements of the underlying database 105 interface and passing those adapted inputs through to the database 105 interface.

The data validation module 335 provides higher-order subroutines which ensure that data recorded in the tables of the database 105 are valid with respect to the expected type and range of data represented.

The authentication module 345 provides a higher-order subroutine which takes as input a username and a password credential for that user, consulting the user table 205 to determine if the username/password combination is valid.

The shipping order module 315 provides subroutines for processing information related to shipping orders (both information received from the warehouses 150A-150M and the merchants 160A-160N). For example, the shipping order module 315 provides subroutines for processing shipping orders received from the merchants 160A-160N (e.g., subroutines for analyzing the shipping orders to determine the number and type of products in each shipping order, determining which of the warehouses 150A-150M store those products, causing the updating of inventory based on the shipping orders, updating or editing an existing shipping order etc.), processing warehouse shipment confirmations received from the warehouses 150A-150N, testing the validity of tracking numbers supplied by the warehouses 150A-150M as proof of shipment, cross-checking the quantity and kind of products shipped against the shipping order details table 215, adjusting inventory counts to reflect the quantities reported shipped, and recording the shipping order completion date.

The returns module 330 provides subroutines for processing warehouse returns receipts, cross-checking the quantities and kinds of products reported received with the shipping order details table 215, adjusting inventory counts to reflect the quantities reported returned, and recording the return date and condition.

The inventory module 325 provides a subroutine for performing an accounting transfer of a quantity of product stock from one inventory phase to another. The inventory module 325 further implements a finite state machine as a guard for ensuring only sensible inventory transitions are allowed.

The project module 320 provides subroutines for transitioning projects through a predetermined workflow of: bid, negotiation, acceptance, execution, and completion; storing and retrieving messages regarding the projects among the warehouses 150A-150M, the system operator 180, and the merchants 160A-160N; storing and retrieving proof of completion; and adjusting inventory to reflect the progress of the projects.

The task module 335 provides subroutines for transitioning tasks through creation and completion and storing and retrieving proof of completion.

The spreadsheet processing module 310 provides a subroutine for reading a file in comma-separated or spreadsheet format and converting it into a format suitable for input to the data validation module 335 and data access module 340.

The inbound shipment module 350 provides subroutines for processing information related to inbound shipments (information both received from the warehouses 150A-150M and the merchants 160A-160N). For example, the inbound shipment module 350 provides subroutines for processing inbound shipment orders received from the merchants 160A-160N (e.g., subroutines for analyzing the inbound shipment orders to determine the type and number of the products in each inbound shipment order, determining which of the warehouses 150A-150M the inbound shipment orders should be redirected, updating an existing inbound shipment order, updating the products table 220, updating the inventory table 225, etc.), processing warehouse inbound receipts received from the warehouses 150A-150M, cross-checking the quantities and kinds of products reported received with the inbound shipment details table 255, adjusting inventory counts to reflect the quantities reported received, and recording the receipt date.

The packing list generation module 360 generates packing list including instructions for warehouses relative to inbound shipment orders. As will be described in greater detail later herein, the packing list generation module 360 generates packing lists based on receiving input via the merchant portal application 125. In some embodiments, the generated packing lists include step-by-step instructions for the warehouse to perform when inbound shipments are received (e.g., step-by-step instructions for how to break down the inbound shipments). In some embodiments, the packing list generation module 360 also generates a graphical representation of a hierarchical inbound shipment.

Figure 4:
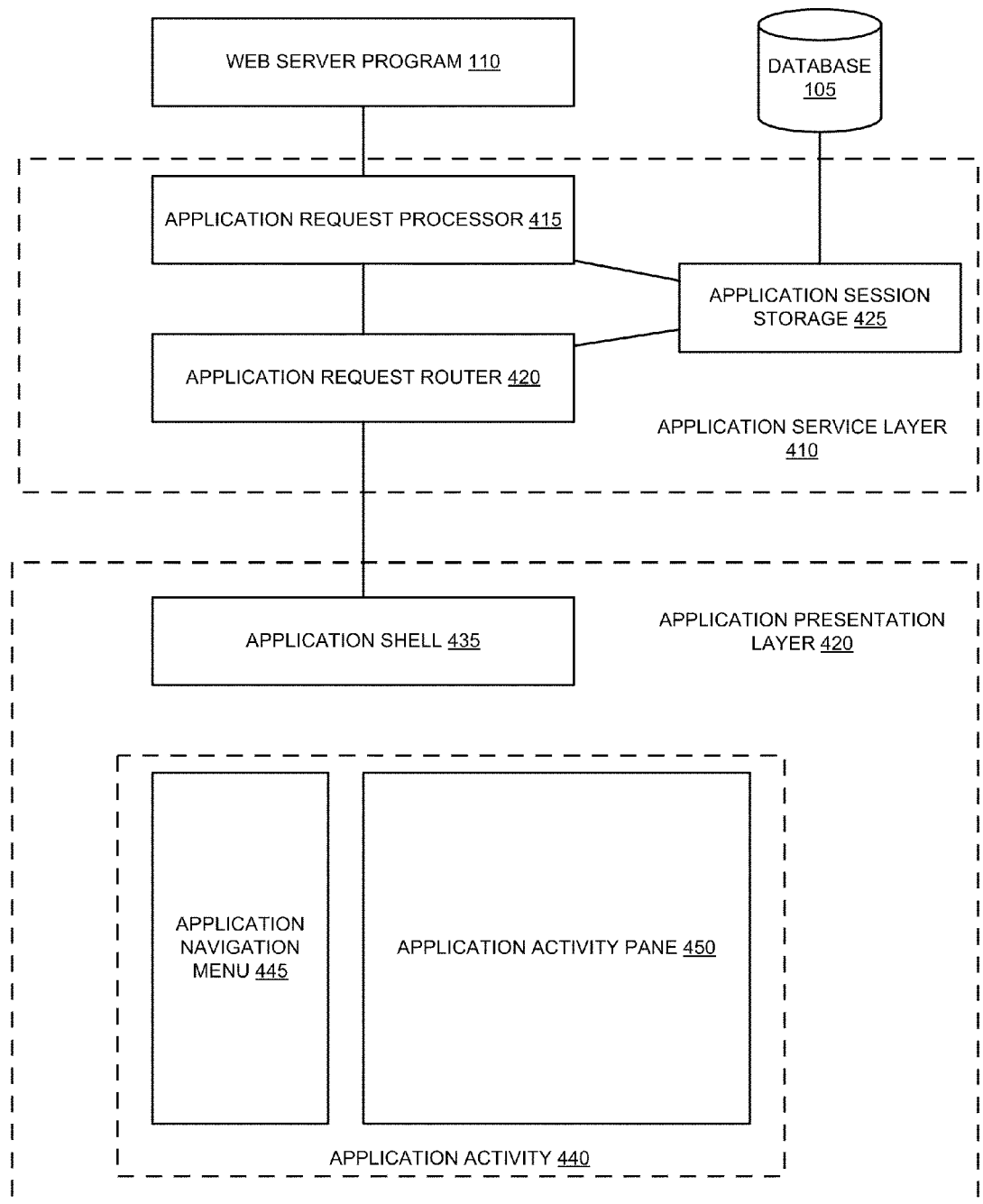
FIG. 4 illustrates a detailed view of an exemplary web application framework used in the online merchants to third party warehouse providers broker and order fulfillment system of FIG. 1 according to one embodiment of the invention.

FIG. 4 illustrates a more detailed web application framework 115 according to one embodiment of the invention. With reference to FIG. 4, the web application framework 115 includes an application service layer 410 and an application presentation layer 430.

The application service layer 410 includes an application session storage 425 for storing temporary data about current users of the system (e.g., merchants 160A-160N and/or the warehouses 150A-150M and/or the system operator 180), an application request processor 415 for validating requests from the web server 110, and an application request router 420 for dispatching requests further based on the content of those requests.

The application presentation layer 430 includes an application shell 435, which renders a visual user interface to accessing devices (e.g., the merchant access devices 165A-165N, the system operator access device 185, and the warehouse access devices 155A-155M) and submits requests based on input received from the accessing devices, an application navigation menu 445 to provide a way for users to select a particular application activity 440, and an application activity pane 450 for conveying and collecting specific information regarding the user's currently selected application activity 440.

The application session storage 425 is a store to hold temporary data related to current users of the web application framework and periodic tasks that remove expired session data from the store. In one embodiment of the invention, the application session storage 425 is a table in the database 105, each row comprising a timestamp-based primary key, the last date of interaction in the session, and a serialized list of data associated with the session, and is periodically cleaned by a task scheduled in a system task scheduler.

As previously described, the application request processor 415 validates requests received from the web server program 110. After the application request processor 415 receives a request passed by the web server program 110, the processor 415 inspects the request for the presence of a session identifier. If no identifier is present, or if the identifier does not correspond to a valid, current session (e.g., as determined by the creation timestamp on the application session) then a new application session, with a unique identifier, is created and stored in the application session storage 410, and returned to the requester as part of any response returned by the web application framework 115. Session data is retrieved from the session data store.

The application request processor further inspects the request for a valid user credential using the authentication module 345. If the request contains a valid user credential, it is stored in the session data store, associated with the session identifier. Additionally, the request is modified in such a way that future processors of the request can recognize the request as an initial login request. If the request does not contain a valid user credential, the session data is inspected for a valid user credential. If no valid user credential is found, a response is returned to the requesting device instructing the user to provide valid credentials (e.g., a valid username and password). In one embodiment of the invention, the requesting user is redirected to a login page if no valid user credential is found.

The validated session data and request data are passed to the application request router 420. After the application request router 420 receives the request passed by the web server program 110, information about the current user is retrieved using the data access module 340. The application request router 420 determines whether the user is one of the merchants 160A-160N, the system operator 180, or one of the warehouses 150A-150M.

After determining the type of user the request belongs, if the request is an initial login request, the request is modified to reflect an appropriate application name ('warehouse', 'sysop', or 'merchant', for warehouse clients, system operators, and merchants, respectively), and the 'home' application action (e.g., the warehouse home page, the system operator home page, or the merchant home page) is forwarded to the application shell 435 for rendering. If the request does not include an application name, an application action name, and application parameters, an error response is returned. In one embodiment of the invention, an error response instructs the web server program 110 to record the time and content of the request which caused the error condition, and directs the user to contact the merchants and warehouses broker and order fulfillment system 190 offline for assistance.

The application name is compared to valid application names for the type of user logged in, which are 'warehouse', 'sysop', and 'merchant' for warehouse clients, system operators, and merchants, respectively. If the application name is not valid for the current user, an error response is returned. In addition, the application action name is compared to a list of valid actions for the application name. If the application action name is not valid for the application name, an error response is returned.

If the application name and the application action name are valid, the request is passed to the module appropriate for the application, either the warehouse portal application 120, the system operator application 128, or the merchant portal application 125, depending on the application name.

The application shell 435 processes requests relayed from the application request router 420. After receiving a request, the application shell 435 inspects the request for the application name which will determine the presentation logic module that must be invoked in order to construct elements of the user interface. In one embodiment of the invention, the application name 'warehouse' implies that the warehouse portal application 120 should be consulted, the application name 'sysop' implies that the system operator application 128 should be consulted, and the application name 'merchant' implies that the merchant portal application 125 should be consulted.

Based on the application name, the application shell 435 invokes a look-up function provided by the determined presentation logic module to discover the name of the function in the presentation logic module that must be invoked to produce a list of possible activities that the user can select. This function is then invoked, and the application shell 435 constructs an application navigation menu 445 comprising instructions for the accessing device to present a set of options to a user for choosing an application activity 440, and instructions for the accessing device to capture any user selection of an activity and submit an activity request to the web server program 110. In one embodiment of the invention, application navigation menu 445 is an HTML list, and selecting an activity causes the web browser to request new activity pane content.

The request is inspected for the application action, and the application shell 435 invokes a look-up function provided by the determined presentation logic module to discover the name of the function in the presentation logic module that must be invoked to construct the application activity pane 450. This function is then invoked, and the application shell 435 constructs an application activity pane 450 which includes instructions for the accessing device to present information comprising text, tables, forms, and controls, and instructions for capturing user interaction with said text, tables, forms, and controls. In one embodiment of the invention, the application activity pane 450 is a block of dynamic HTML code.

The application shell 435 combines the constructed application navigation menu 445 and application activity pane 450 into an application page and returns a response to the accessing device with instructions to draw the application page and await further user input. In one embodiment of the invention, the application page is a complete HTML page with a dynamic menu.

Figure 5:
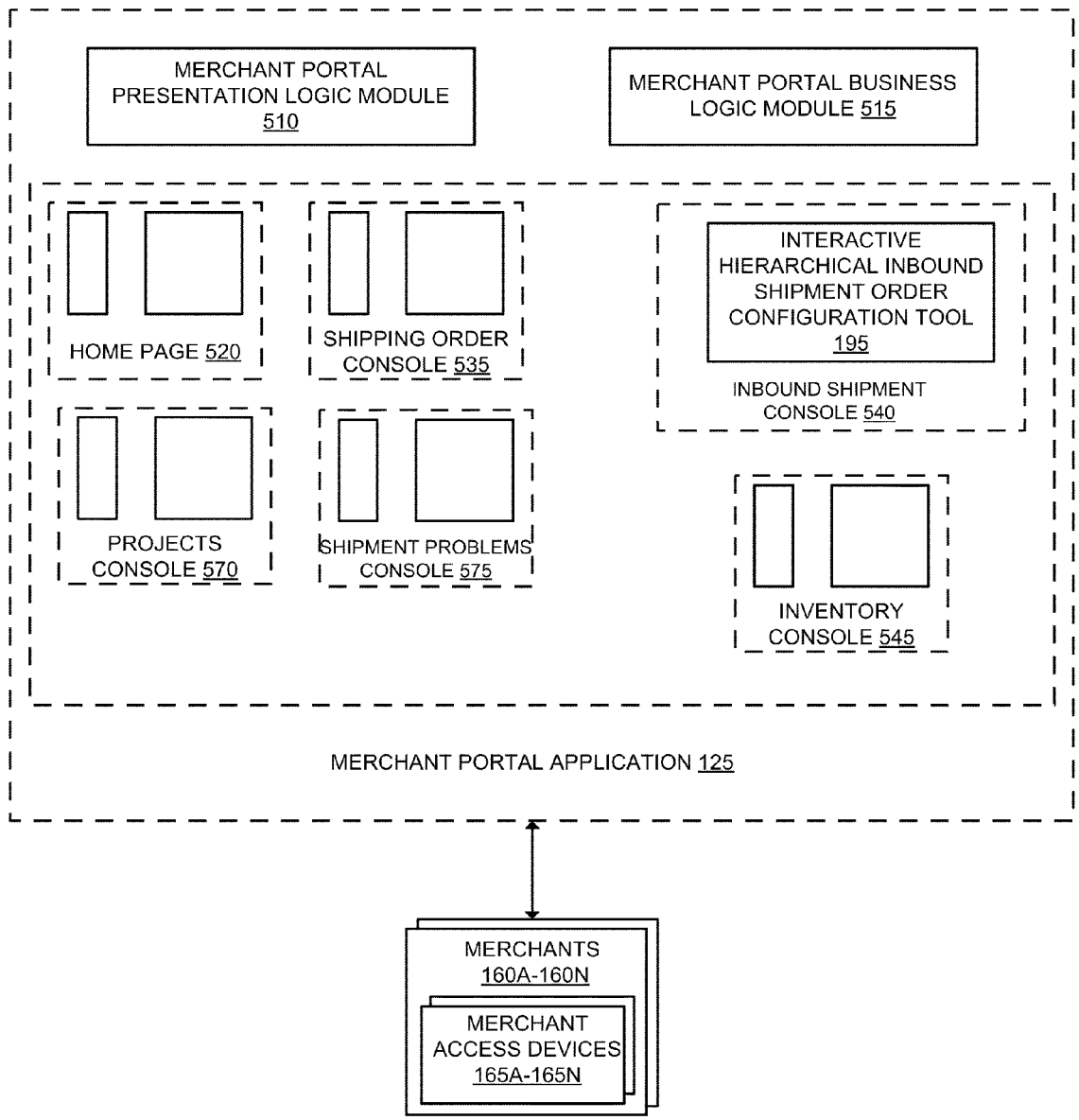
FIG. 5 illustrates an exemplary embodiment of the merchant portal application of the online merchants to third party warehouse providers broker and order fulfillment system of FIG. 1 according to one embodiment of the invention.

FIG. 5 illustrates an exemplary embodiment of the merchant portal application 125 according to one embodiment of the invention. With reference to FIG. 5, the merchant portal application 125 includes a merchant presentation logic module 510 and a merchant business logic module 515, which cooperate to provide the user experience and operative function of the sections of the merchant portal application 125. In one embodiment of the invention, these sections include the merchant home page 520, shipping order console 535, inbound shipment console 540, inventory console 545, projects console 570, and the shipment problems console 575. In one embodiment of the invention, each console is implemented in the form of a web page. Each console of the merchant portal application 125 includes a presentation logic component and a business logic component which are reposed in the merchant presentation logic module 510 and merchant business logic module 515, respectively.

In this specification, when an embodiment of a section's functional operation or module utilization is discussed, it is construed to mean the coordinated execution of functions and subroutines from modules named therein, along with any necessary temporary storage of results of said functions needed for further computation or for use in the presentation. In this specification, when an embodiment of a section's presentation is discussed, it is construed to mean the programmatic assembly of instructions to an accessing device to render that presentation and await further user input.

The merchant home page 520 provides a summary overview of all outstanding pending services requested by a particular merchant, broken down by warehouse. In one embodiment of the invention, the total quantity of outstanding unexecuted shipping orders, unreceived inbound shipments (those inbound shipments not yet received by the warehouses), and incomplete special projects are presented. The data presented on the merchant home page 520 is obtained by invoking functions in the shared business logic module 130 and accessing appropriate tables in the database 105.

The merchant shipping order console 535 provides a shipping order interactive editing tool that allows each merchant user to create new shipping orders for execution by selected ones of the warehouses 150A-150M, or edit existing shipping orders. In one embodiment of the invention, the shipping order interactive editing tool presents a form into which the merchant user may enter or modify shipping order and shipping order details information, and a submission button for requesting processing. The shipping order interactive editing tool utilizes the shared business logic module 130 and new or updated shipping order information is stored in the shipping orders table 210 of the database 105. This embodiment of the invention may be used to enter in bulk shipping orders.

In another embodiment of the invention, the merchant access devices 165A-165N of the merchants 160A-160N automatically send new or edited shipping orders to the order fulfillment system 190 for processing upon receiving new or edited shipping orders. For example, responsive to buyers selecting product(s) to purchase from the merchants 160A-160N, corresponding shipping orders are transmitted to the order fulfillment system 190, and processed by the merchant portal application 125. Thus, the merchant shipping order console 535 may directly receive new or edited shipping orders and process them by utilizing the shipping order module 315. For example, the merchants and warehouses broker and order fulfillment system 190 may be integrated with e-commerce shopping carts of the merchant access devices 165A-165N of the merchants 160A-160N or directly integrated with buy buttons such as PayPal Buy Now buttons. New or updated shipping order information is stored in the shipping orders table 210 of the database 105. Thus, in this embodiment of the invention, the merchant shipping order console 535 provides a real-time integration of shipping orders with the merchant access devices 165A-165N of the merchants 160A-160N.

After receiving and processing a shipping order at the order fulfillment system 190, the shipping order will be accessed by the appropriate ones of the warehouses 160A-160N. The warehouses 160A-160N may access received shipping orders using the shipping order export tool of the shipping orders section 540 and/or the merchants and warehouses broker and order fulfillment system 190 may automatically transmit the shipping orders to the warehouses 160A-160N upon completing the processing of those received shipping orders.

The merchant inbound shipment console 540 provides an inbound shipment interactive editing tool, and an interactive hierarchical inbound shipment order configuration tool 195. The inbound shipment interactive editing tool allows merchant users to create new inbound shipments and alert the warehouses of their arrival, or edit existing inbound shipments. In one embodiment of the invention, the inbound shipment interactive editing tool presents a form into which the merchant users may enter or modify inbound shipment and inbound shipment details information, and a submission button for requesting processing. The inbound shipment interactive editing tool utilizes the shared business logic module 130 and new or edited inbound shipment information is stored in the inbound shipments table 240 of the database 105.

The interactive hierarchical inbound shipment order configuration tool 195 of the merchant inbound shipment console 540 allows merchants to create new hierarchical inbound shipment orders and alert the warehouses of their corresponding hierarchical inbound shipment arrival. As used herein, a hierarchical inbound shipment is an inbound shipment where products are packaged in multiple levels (e.g., packed within a container, which is packed into another container, which is itself put onto a pallet and shipped to the warehouse). In one embodiment, the interactive hierarchical inbound shipment order configuration tool 195 is a graphical user interface that allows the merchants to configure a hierarchical inbound shipment order for a corresponding hierarchical inbound shipment as will be described in greater detail later herein.

The merchant inventory console 545 provides a tool for a particular merchant to view its data stored in the inventory table 225 in the database 105, broken down by warehouse. In one embodiment of the invention, the data is presented in a grid and warehouse-reported snapshot counts are presented alongside the system's tracked counts. The merchant inventory console 545 further provides a product interactive editing tool which allows a user to create a new product, or edit an existing product. In one embodiment of the invention, the product interactive editing tool presents a form into which the user may enter or modify key product information, and a submission button for requesting processing. The product interactive editing tool utilizes the shared business logic module 130 and new or edited product information is stored in the products table 220 of the database 105.

The merchant projects console 570 provides an interactive workflow tool, utilizing the shared business logic module 130, which allows a merchant user to review all outstanding projects and their associated details, enter or revise a project and its details, send a message to a particular one of the warehouses 150A-150M regarding the project, accept or reject a bid and completion estimate on the project, review progress on a project, and review a project's proof of completion. In one embodiment of the invention, the interactive workflow tool of the merchant projects console 570 presents a grid with the outstanding projects and their summary information. The user may select an individual project and choose to review the project in detail and then the user is presented with additional information regarding the project including past messages exchanged with that warehouse, the status of the project (one of 'new', 'awaiting merchant response', 'awaiting warehouse response', 'accepted', 'complete'), any proposed bid on the project and whether the bid has been accepted, the products involved in the project and their quantities, specific details on what is being requested, controls allowing the user to cancel a project, controls allowing the user to edit details of an uncommitted project, controls allowing the user to counter-propose a bid on an a bidded, unaccepted project, controls allowing the user to counter-propose a completion estimate on an estimated, unbidded project, controls allowing the user to send a new message to the warehouse, controls allowing the user to accept the project at the current bid and completion estimate, and controls allowing the user to provide a concise textual or pictoral certification of completion of a project.

The merchant shipment problems console 575 provides a tool for reporting to the warehouses 150A-150M an undershipment, overshipment, or damaged shipment of goods to buyers. In one embodiment of the invention, the tool provides an interface for finding an order based on any shipping order datum. After the order is identified, the user is given a grid of shipping order details where they may indicate which order details were overshipped, undershipped, or damaged, and by what quantity. Additionally, a control is provided to allow the user specify other products, not in the shipping order, which were overshipped. A control is provided for submitting the problem report, and upon submission, the shipment problem is recorded as a task for the warehouse 150A-150M that performed the shipping of the undershipment, overshipment, or shipment of damaged goods, to investigate.

The merchant portal application 125 provides the merchants 160A-160N a single interface to many warehouses (e.g., each of the warehouses 150A-150M) which may be spread throughout the world. Thus, each one of the merchants 160A-160N does not need to negotiate and integrate with each individual warehouse (e.g., in order to configure a hierarchical shipment order for those warehouses) and does not need to develop their own order allocation, submission, and tracking system.

Figure 6:
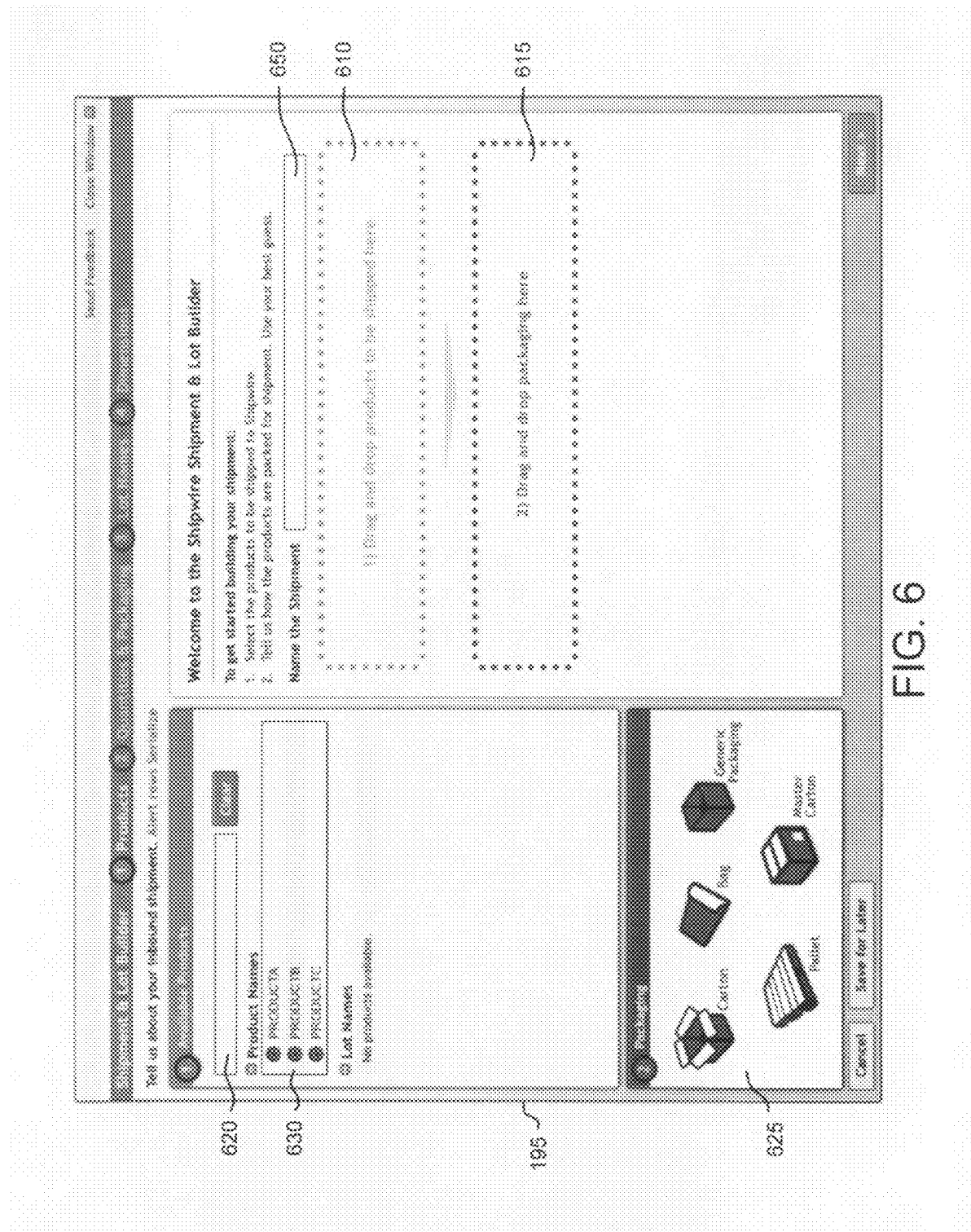
FIG. 6 illustrates an exemplary screen of the interactive hierarchical inbound shipment order configuration tool for merchants to begin configuring a hierarchical inbound shipment order according to one embodiment of the invention.

FIG. 6 illustrates an exemplary screen of the interactive hierarchical inbound shipment order configuration tool for merchants to begin configuring a hierarchical inbound shipment order according to one embodiment of the invention. As described above, the interactive hierarchical inbound shipment order configuration tool 195 is provided as part of the inbound shipment order console 540 and allows each of the merchants 160A-160N to configure a hierarchical inbound shipment of multiple levels. In one embodiment, the screen illustrated in FIG. 6 is provided to a merchant responsive to receiving a request from the merchant to use the interactive hierarchical inbound shipment order configuration tool 195.

The interactive hierarchical inbound shipment order configuration tool 195 allows the merchants to configure their inbound shipment orders in multiple levels of hierarchy that match their corresponding hierarchical inbound shipments by including a product level (which will include one or more product type objects), one or more container levels (each including one or more container objects), and an inbound shipment level. As illustrated in FIG. 6, there is a product level 610 and a container level 615.

Merchants populate the product level 610 with one or more product type objects listed in the product name storage list 630. Each product type object in the product level 610 represents an amount of physical product type in the hierarchical inbound shipment. The product level 610 represents the bottom of the hierarchy. For example, if considering the hierarchy as a tree, the product type objects in the product level 610 are the leaf nodes of the tree. The product name field 620 receives input from the merchant regarding names of products that will be included in the hierarchical inbound shipment order. A product is defined from the point of view of the merchant (i.e., the merchant determines what is considered a product). For example, a product can be a single item, a group of like items, or a group of dissimilar items. The product name storage list 630 is a list of the product names which have been entered in the product name field 620 by the merchant using the tool. In one embodiment, the product names used by a merchant in a previous configuration of a hierarchical inbound shipment automatically populate the product name storage list 630.

In one embodiment, the merchants perform drag and drop operations to populate the product level 610 with one or more product type objects (this will be described in greater detail with reference to FIG. 7). Merchants also populate the container level 615 with one or more of container objects represented in the container section 625. The container level 615 represents intermediate levels of the hierarchy. For example, if considering the hierarchy as a tree, the container objects of the container level 615 are internal nodes (sometimes referred to as branch nodes or intermediary nodes). In one embodiment, the merchants perform a drag and drop operation to populate the container level 615 with one or more of the container objects represented in the container section 625. The container section 625 includes a graphical representation of several different types of container objects including a carton, a bag, a generic package, a master carton, and a pallet. Each different type of container object may be used in any of the container levels as will be described later herein. However, logically most merchants will classify the carton, bag, and generic package as being on the same level, a master carton being senior to a carton, and a pallet senior to a master carton. Although FIG. 6 illustrates a single container level 615, it should be understood that there may be multiple container levels. Each container object populated to the container level 615 (or other container levels) represents one or more physical containers in the hierarchical inbound shipment.

The hierarchical inbound shipment order may be named via the shipment name field 650. Shipment orders may be named and saved for later use (e.g., if the merchant periodically refreshes their inventory with the same inbound shipment). According to one embodiment, if the merchant does not enter a name for the shipment order, a default name will be generated and used.

Figure 7:
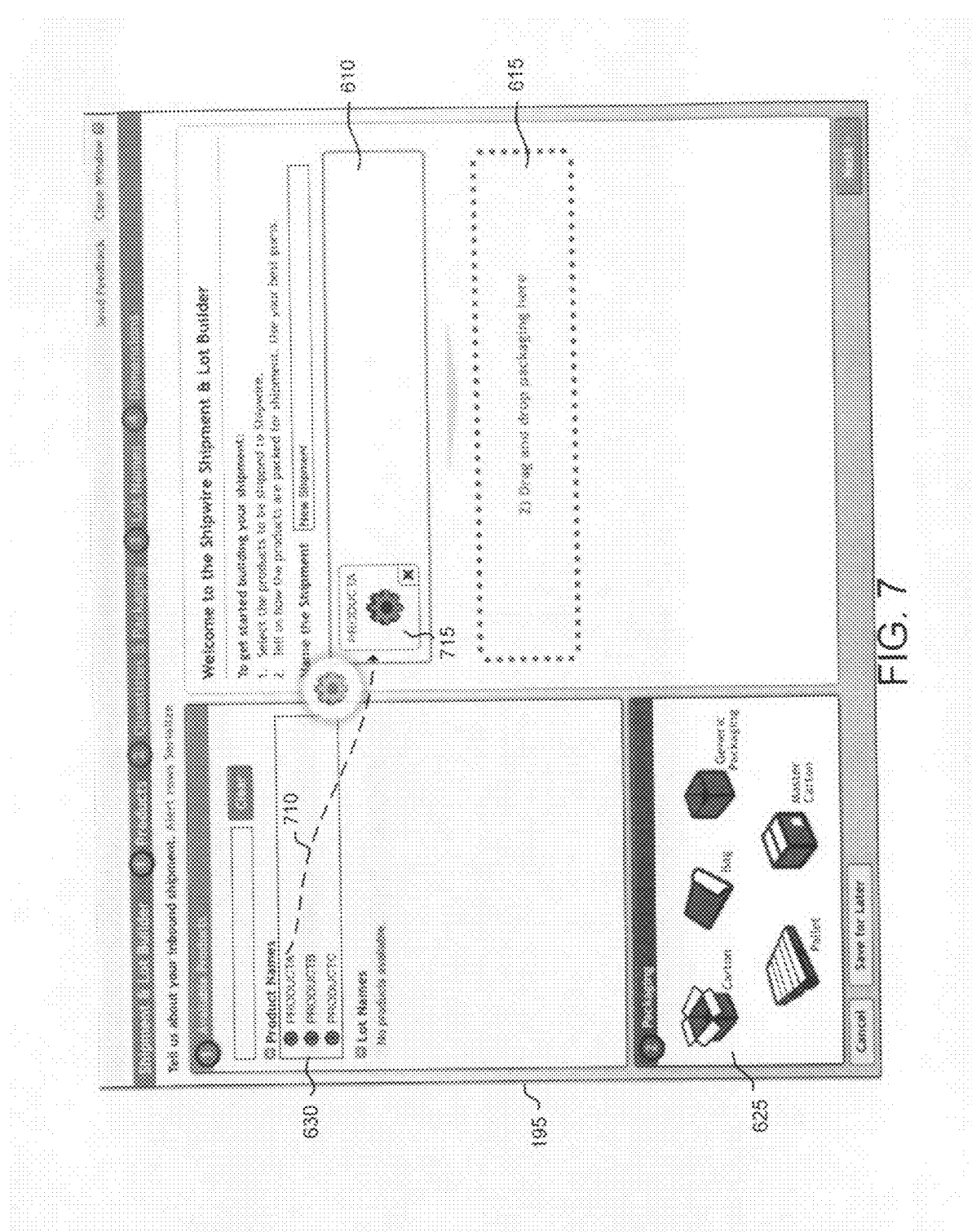
FIG. 7 illustrates an exemplary drag and drop operation to populate a product level of a hierarchical inbound shipment order with one or more product types according to one embodiment of the invention.

FIG. 7 illustrates an exemplary drag and drop operation to populate the product level 610 with one or more of the product type objects listed in the product name storage list 630 according to one embodiment of the invention. As illustrated in FIG. 7, a merchant has selected the PRODUCTA of the product name storage list 630 and dragged PRODUCTA to the product level 610, which populates PRODUCTA as the product object 715 in the product level 610. It should be understood that other ones of the product types listed in the product name storage list 630 may be populated to the product level 610 with similar drag and drop operations.

Figure 8:
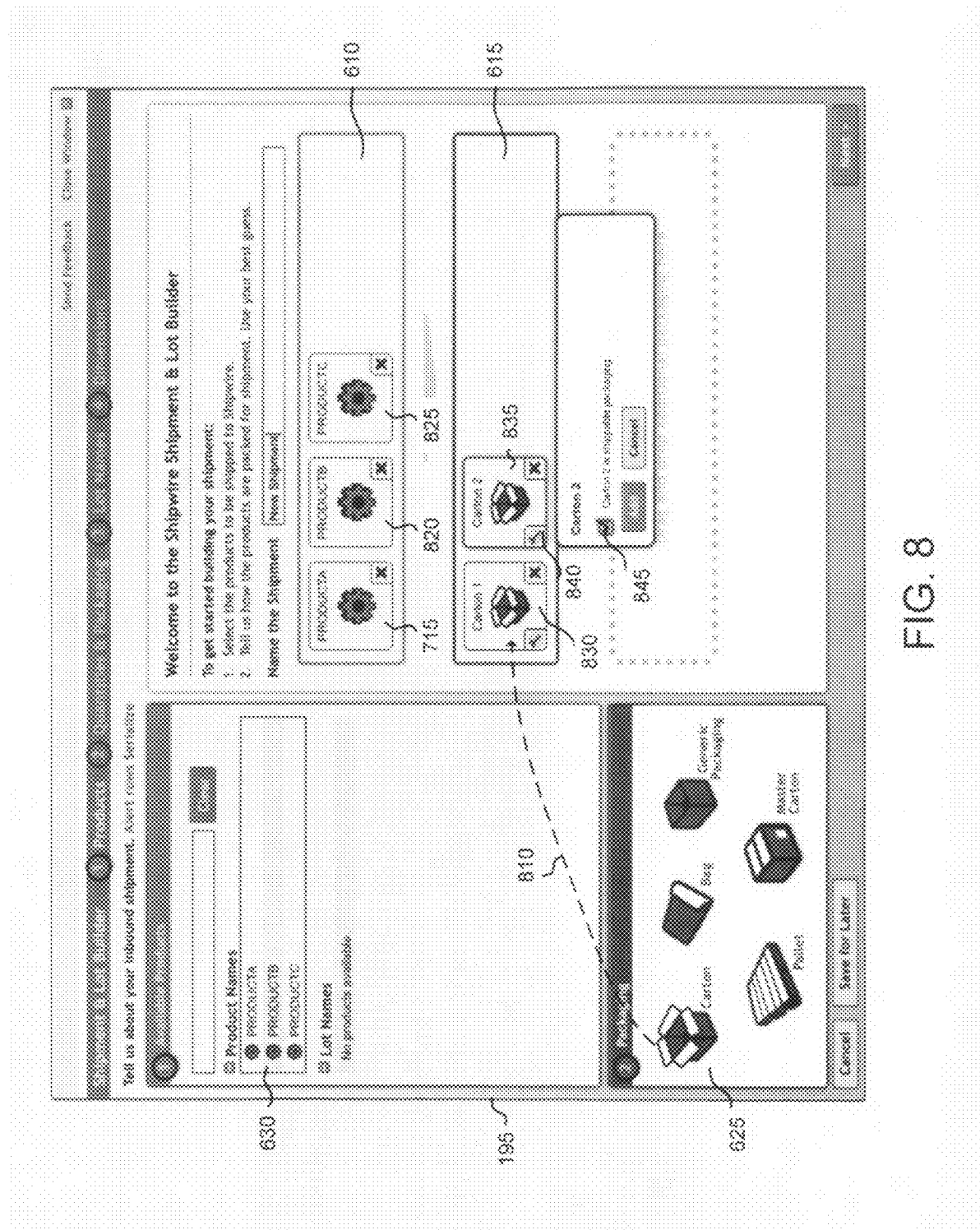
FIG. 8 illustrates an exemplary drag and drop operation to populate a container level of a hierarchical inbound shipment order and provide an indication whether a container is a shippable package according to one embodiment of the invention.

FIG. 8 illustrates an exemplary drag and drop operation to populate the container level 615 and provide an indication whether a container is a shippable container package according to one embodiment of the invention. As illustrated in FIG. 8, a merchant selects a container object from the container section 625 (e.g., a carton) and drags the selected container to the container level 615 which includes the selected container as the container object 830 in the container level 615. The container object 830 represents one or more physical containers in the hierarchal inbound shipment. Similarly, the merchant has caused the product type objects 820 and 825 to be populated to the product level 610 and the container object 835 to be populated to the container level 615.

Each of the product type objects at the product level 610 (e.g., the product type objects 715, 820, 825) and each of the container objects at the container level 615 (e.g., the container objects 830 and 835) may represent one or more physical products or physical containers respectively that is intended by the merchant to be a shippable package (e.g., a shippable product package or a shippable container package). A shippable package is a product or container that potentially will be shipped to a customer without a modification of the contents of the product or container (e.g., without removing or adding items to the package). Although a shippable package is a product or container that will potentially be shipped, it should be understood that other actions may need to be performed on the shippable package in order for it to be shipped (e.g., placing a label on the package, generating a tracking number for the package, etc.). In some circumstances, a shippable package will not be shipped to a customer. For example, at a later time, the merchant may request a shippable container package to be broken down and its contents inventoried, which will be described in greater detail with reference to FIGS. 15-17. Thus, in some embodiments, the merchant designates that a container object represents one or more shippable container packages and/or a product type object represents one or more shippable product packages. By way of example, the merchant has indicated that the container objects 830 and 835 each represent physical containers that are shippable packages.

In some embodiments, the warehouses that receive the inbound shipments treat a shippable package differently than other packaging. For example, typically the warehouses will not initially break down a shippable container package (they may do so later upon receiving instructions).

As illustrated in FIG. 8, the merchant has indicated that the container object 835 represents one or more physical containers that each are shippable container packages by selecting the shippable package indication box 845. In one embodiment, a window displaying the shippable package indication box 845 is displayed on the interactive hierarchical inbound shipment order configuration tool 195 responsive to the merchant completing the drag and drop operation that populated the container object 835 to the container level 615. In another embodiment, the merchant selects the container object 835 (e.g., the options button 840 of the container object 835) which causes the window displaying the shippable package indication box 845 to be displayed on the interactive hierarchical inbound shipment order configuration tool 195. A number of other configuration operations may be presented to the merchant upon selection of the option button 840 (e.g., editing the name of the container object 830, editing a quantity included in the container object 830, editing the shippable package indicator, etc.). In alternative embodiments of the invention, merchants may designate individual ones of the physical containers that each container object represents as being a shippable package.

In some embodiments of the invention, the merchant designates whether product type objects represent shippable product packages through use of the interactive hierarchical inbound shipment order configuration tool in a similar fashion as designating shippable container packages. In alternative embodiments of the invention, each product type is assumed to represent one or more shippable product packages unless the merchant designates otherwise.

Each subsequent level in the hierarchy represents a nesting of packaging. The merchant specifies the nesting by creating associations between objects at different hierarchical levels. In one embodiment, the interactive hierarchical inbound shipment configuration tool allows the merchants to create associations between objects at different levels through a drag and drop operation (e.g., dragging an object at a lower level of the hierarchy onto an object at a higher level of the hierarchy). An association indicates that a number of a lower level item of the hierarchy is packaged (or will be packaged) into one or more higher level item of the hierarchy (e.g., a number of a particular physical product type represented by a product type object from the product level 610 is packaged (or will be packaged) into one or more physical containers represented by one or more container objects in the container level 615). A lower level item may be associated with one or more lower higher items at one or more different higher levels. A higher level item may be associated with one or more lower level items at one or more different lower levels.

Figure 9:
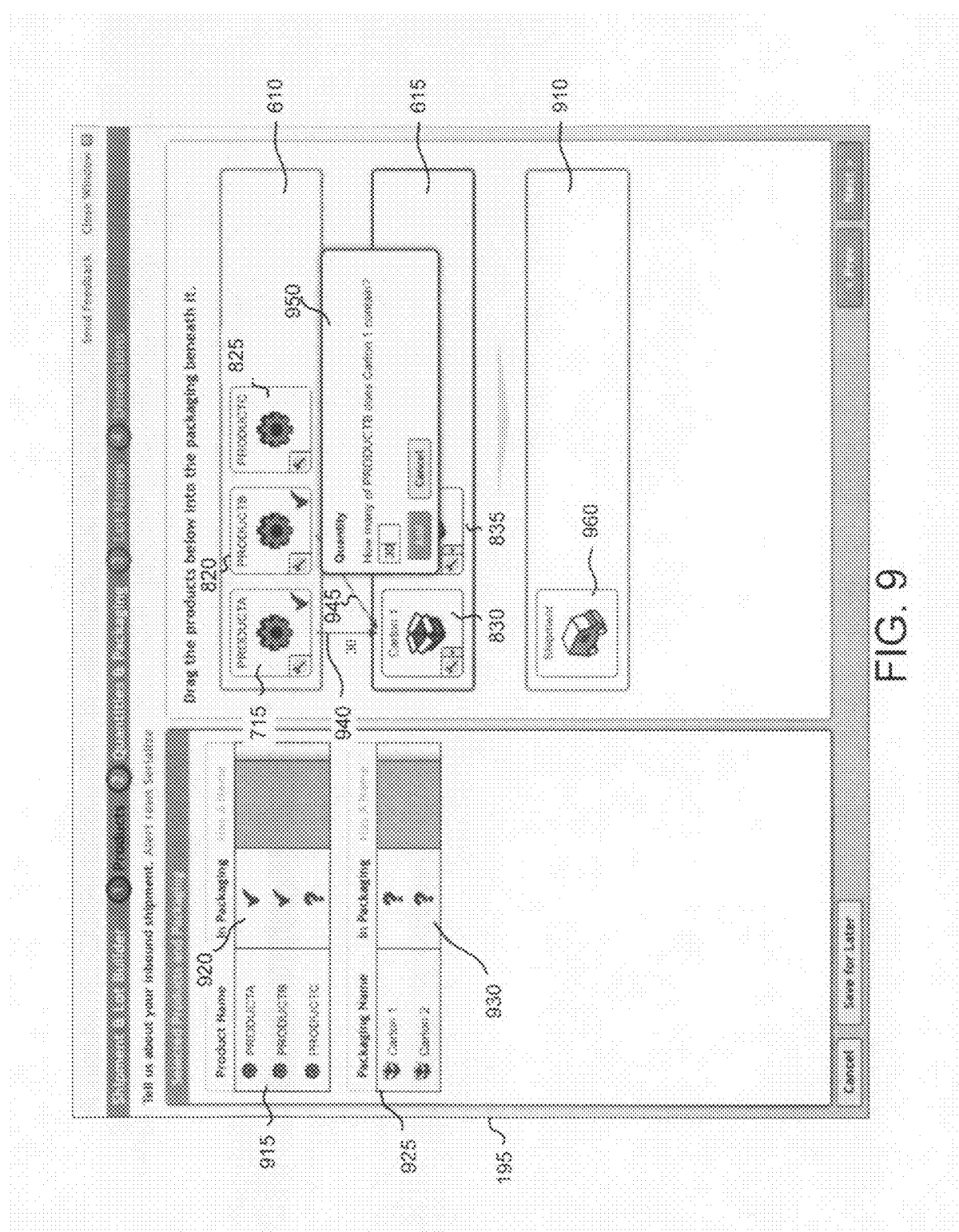
FIG. 9 illustrates creating associations between hierarchical levels according to one embodiment of the invention.

FIG. 9 illustrates creating associations between hierarchical levels according to one embodiment of the invention. In some embodiments, the interactive hierarchical inbound shipment order configuration tool 195 creates an association between hierarchical levels responsive to receiving from the merchant a drag and drop input operation from an object in a lower level onto an object in a higher level. For example, the association 940 is created responsive to receiving from the merchant a selection and dragging of the product type object 715 to the container object 830, which indicates that a number of the physical product type corresponding to the product type object 715 will be packaged (or is packaged) into one or more of the physical containers represented by the container object 830. As another example, the hierarchical inbound shipment order configuration tool 195 creates the association 945 responsive to receiving a drag and drop operation of the product type object 820 onto the container object 830. Thus, the container object 830 is associated with multiple product types (i.e., the product types 715 and 820). Thus, the physical container represented by the container object 830 will include a number of physical products corresponding to the product type object 715 and a number of physical products corresponding to the product type object 820. Although not illustrated in FIG. 9, the interactive hierarchical inbound shipment order configuration tool 195 may similarly create one or more associations for each of the container objects in the container level 615 with different container objects in different container levels. Also, the interactive hierarchical inbound shipment order configuration tool 195 may create an association between any of the objects in any of the levels with the shipment transportation object 960 of the inbound shipment level 910 which represents what is being transported to the warehouse (e.g., the final level of what is put onto a truck) responsive to receiving merchant input.

In one embodiment, associations cannot be created between objects at the same level (e.g., an association may not be created between the product type object 715 and the product type object 820).

In one embodiment, the associations are graphically illustrated on the interactive hierarchical inbound shipment order configuration tool 195 with an arrow from the object at the lower level with the object at the higher level. For example, the association 940 is graphically illustrated as an arrow from the product type object 715 to the container object 830.

Each association also represents a quantity of items of a lower level that will be packaged into a higher level (e.g., the number of products for a product type being packaged into a container, the number of containers being packaged into a different container, the number of containers being placed on a transportation vehicle (e.g., truck, airplane, train, ship, or other transportation means), etc.).

In one embodiment, the interactive hierarchical inbound shipment order configuration tool 195 allows the merchants to indicate there are multiple inbound shipment transportation vehicles per a single shipment transportation object.

According to some embodiments, the interactive hierarchical inbound shipment order configuration tool 195 queries the merchant to enter in the quantity upon completion of the drag and drop operation between levels. For example, upon completion of dragging and dropping the product type object 820 to the container object 830, the quantity query box 950 is presented to the merchant requesting the merchant to input the number of physical products corresponding with the product type object 820 that will be included (e.g., packed within) each of the physical containers corresponding to the container object 830. In some embodiments a quantity of one is assumed if the merchant does not input a quantity, while in other embodiments the merchant must input a quantity (e.g., an error message is displayed alerting the merchant to input a quantity of one is not entered).

By way of example, the interactive hierarchical inbound shipment order configuration tool 195 has received input from the merchant indicating that there will be 30 products corresponding with the product type object 715 included in the physical container corresponding with the container object 830 and 30 products corresponding with the product type object 820 included in the physical container corresponding to the container object 830. In one embodiment, a number matching the inputted quantity is displayed next to, or on, the arrow representing the association (e.g., the number 30 is displayed next to the arrow representing the association 940).

As illustrated in FIG. 9, the product name storage list 915 includes a column 920 indicating whether each product type object in the product level 610 (e.g., the product type objects 715, 820, and 825) has been included in either a container object or the shipment transportation object 960 (e.g., a checkmark indicates that a product type object has been included and a question mark indicates a product type object has not been included) to alert the merchant of the configuration status of the product type objects in the inbound shipment order. Similarly, the container list 920 includes a column 930 indicating whether each container object in the container level 615 (e.g., the containers 830 and 835) has been included in either a different container object or the shipment transportation object 960.

Figure 10:
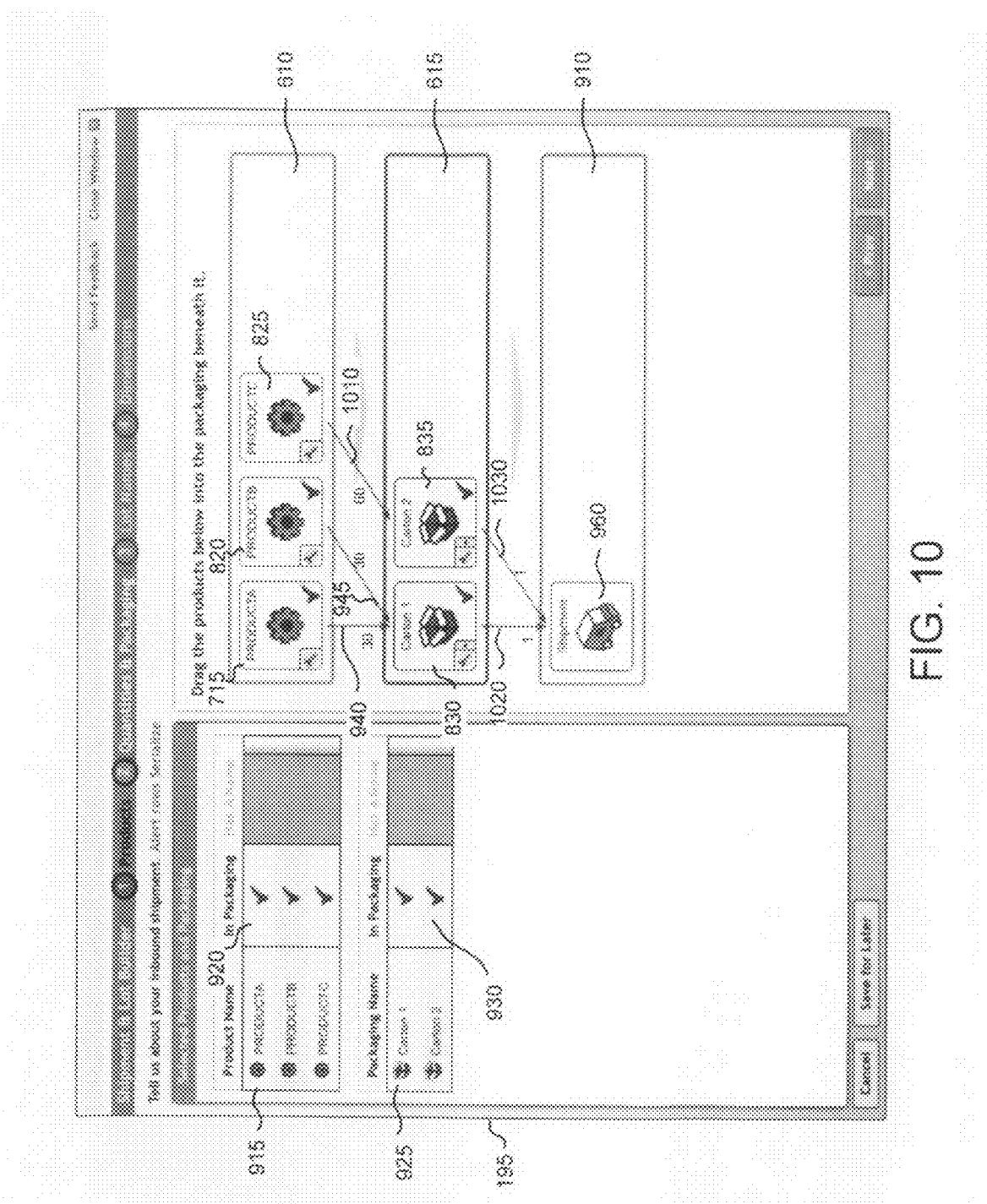
FIG. 10 illustrates the hierarchical inbound shipment order illustrated in FIG. 9 with associations that have been complete.

FIG. 10 illustrates the hierarchical inbound shipment order illustrated in FIG. 9 with associations that have been complete. Thus, in addition to the associations 940 and 945, the associations 1010, 1020, and 1030 have been created. The association 1010 indicates that a number of physical products corresponding with product type object 825 will be included in the container corresponding with the container object 835 (e.g., 60 products as illustrated). The association 1020 indicates that a number of physical containers corresponding with the container object 830 will be included in the shipment transportation corresponding to the shipment transportation object 960 (e.g., 1 container as illustrated). The association 1030 indicates that a number of physical containers corresponding to the container object 835 will be included in the shipment transportation corresponding to the shipment transportation object 960 (e.g., 1 container as illustrated).

As illustrated in FIG. 10, the hierarchical inbound shipment order is horizontally collapsed into the product type objects 715, 820, and 825, the container objects 830 and 835, and the inbound shipment transportation object 960 to conceal the amount of physical products represented by each of the product type objects 715, 820, and 825 and the amount of physical containers represented by each of the container objects 830 and 835. Although FIG. 10 illustrates a relatively simple hierarchy, as the hierarchy becomes more complex, the horizontally collapsed view allows the merchant to quickly view the relationships (e.g., the vertical, hierarchical relationship) between the objects in the different levels without overwhelming the merchant with information relating to the quantity for each relationship (in one embodiment the quantity is illustrated with a number near, or next to, each relationship). Thus, the interactive hierarchical inbound shipment order configuration tool 195 displays to the merchants the product type objects, container type objects, the inbound shipment transportation object, and their associations (e.g., their vertical, hierarchical relationship) and not a representation of the individual physical products and physical containers represented by the product type objects and the container type objects respectively.

Figure 11:
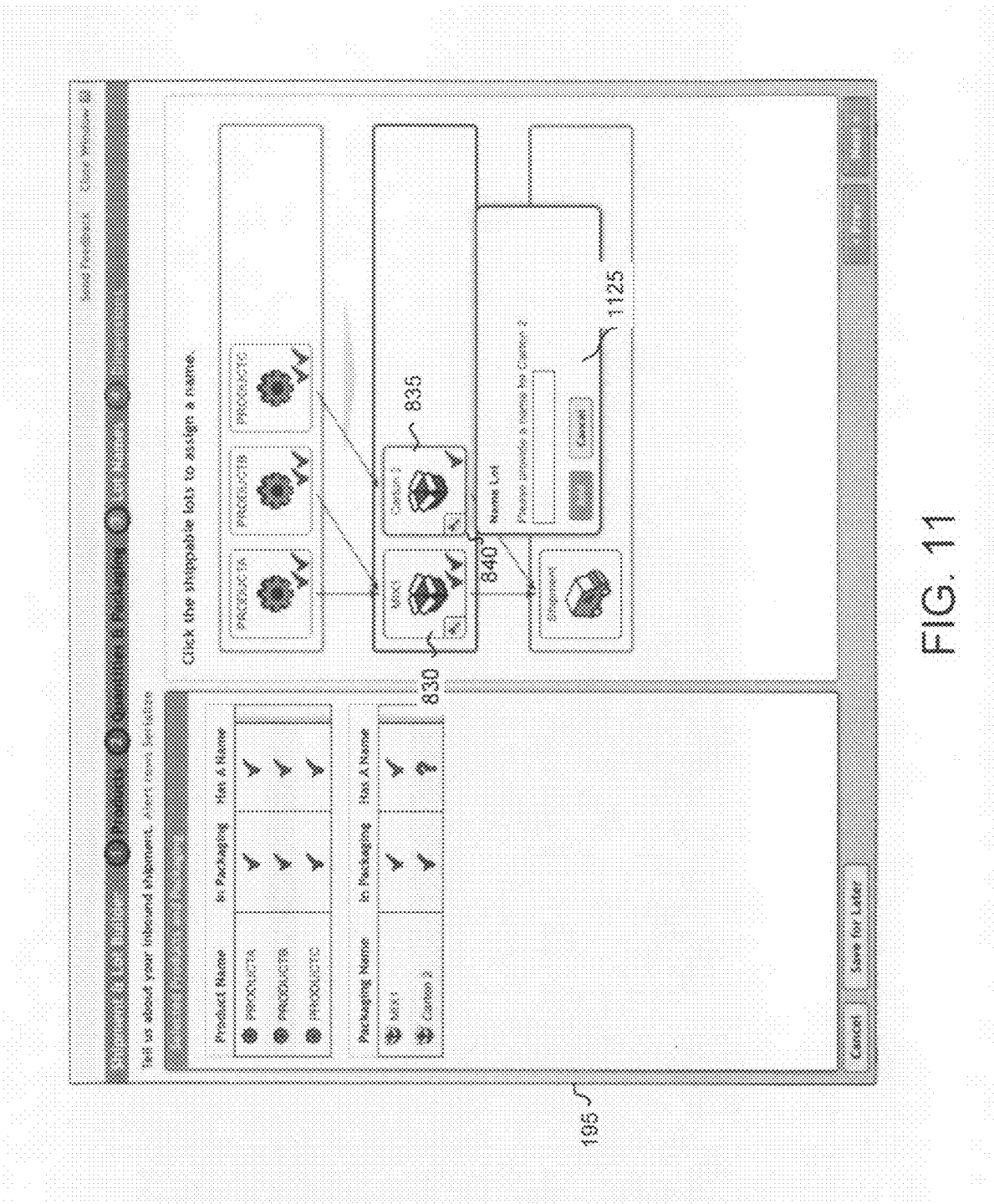
FIG. 11 illustrates changing the name of a container object according to one embodiment of the invention.

FIG. 11 illustrates changing the name of a container object according to one embodiment of the invention. The merchant may change the name of each container object in any of the container levels. In one embodiment, the interactive hierarchical inbound shipment order configuration tool 195 displays the name change window 1125 for a container object (e.g., the container object 835) upon receiving a selection from the option box (e.g., option box 840) of that container object. As illustrated in FIG. 11, the container object 830 has been named MIX1 and the container object 835 will be named MIX2.

Figure 12:
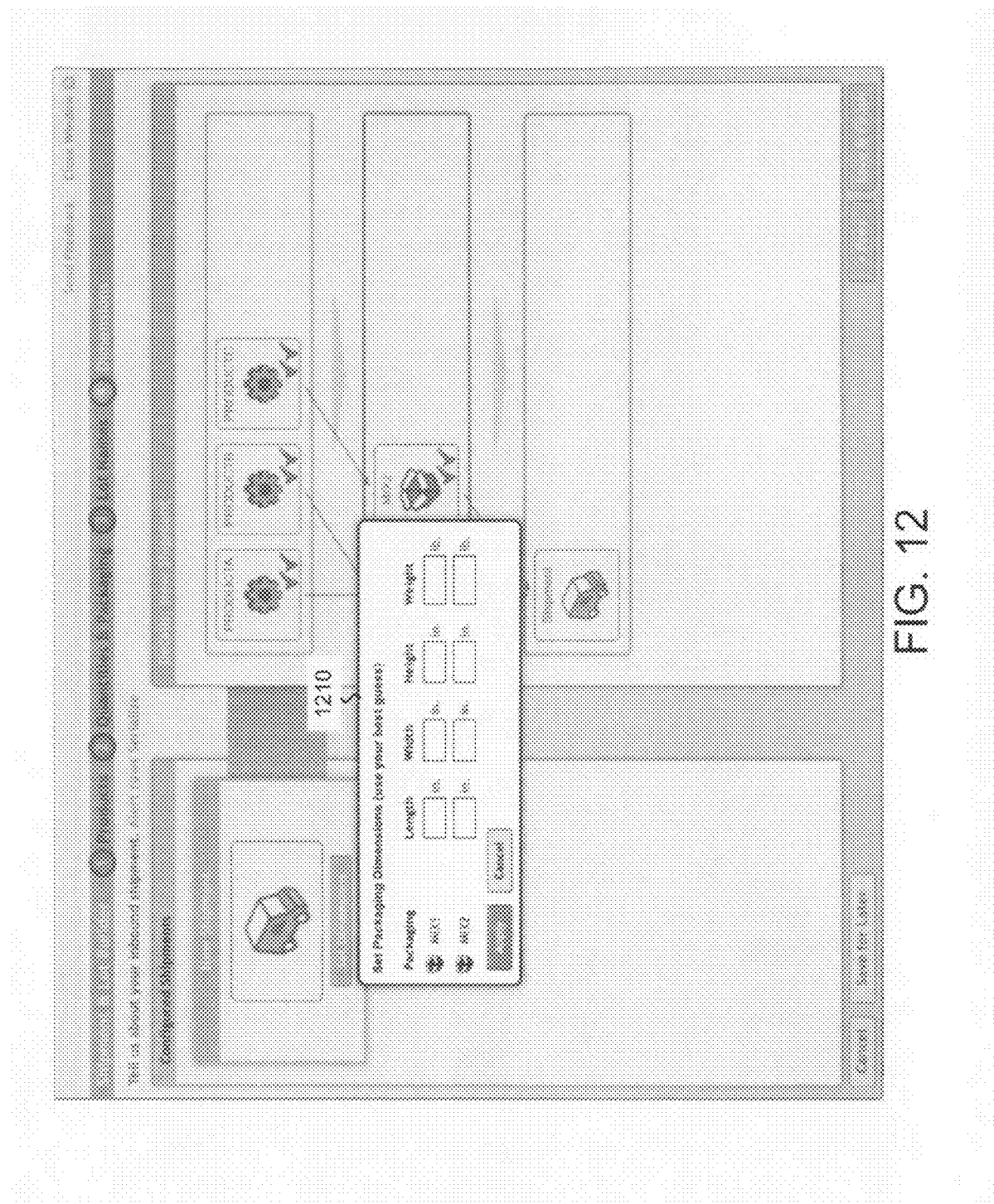
FIG. 12 illustrates a dimension window query box, which allows the merchants to input the dimensions for the inbound shipment according to one embodiment of the invention.

FIG. 12 illustrates a dimension window query box 1210, which allows the merchants to input the dimensions for the inbound shipment according to one embodiment of the invention. According to one embodiment, completion of the information of the dimension window query box 1210 is optional.

As illustrated in FIGS. 6-12, the interactive hierarchical inbound shipment order configuration tool 195 allows merchants to graphically match their hierarchical inbound shipments with their hierarchical inbound shipment orders which reduces the possibility that the merchant will make a mistake in configuring their hierarchical inbound shipment orders. For example, in prior art mechanisms, the merchants could not provide other levels of the hierarchy in a hierarchical inbound shipment other than the shippable packages. Because of the limited information that the merchant could provide in prior art implementations, the merchants sometimes provided incorrect information which could cost the merchants money and wasted time. For example, an error commonly seen in prior art implementations was the merchants listing individual products as individually shippable packages when those products actually were actually packaged into a container that was meant to be shipped (the products were not meant to be shipped individually)). This error may cause the warehouse receiving the inbound shipment to treat each product as individually shippable (and charge for each of those products). In contrast, the interactive hierarchical inbound shipment order configuration tool 195 allows merchants to graphically represent their inbound shipments which reduces the chance of mistakes during configuration including indicating which container(s) or product(s) are shippable packages.

After the hierarchical inbound shipment order is configured, the packing list generation module 360 generates a packing list based on that configured hierarchical inbound shipment. In one embodiment, the packing list generation module 360 generates a packing list that lists the highest level shippable packages for each branch of the hierarchy (e.g., for each branch, those shippable package(s) which will be encountered first by the warehouse) (along with a description and a quantity), and generates a graphical hierarchical representation of the packing list which illustrates the hierarchy of the inbound shipment, which may each be used by the warehouse receiving the corresponding inbound shipment order. In one embodiment, the graphical hierarchical representation includes the entire hierarchy of the inbound shipment including levels below what the warehouse will inventory. In other embodiments, the graphical hierarchical representation includes, for each branch of the hierarchy of the inbound shipment, the container objects at the highest level of the hierarchical inbound shipment order down to the earlier of the container objects that represent shippable packages or the product type objects.

Figures 13A, 13B, 13C:
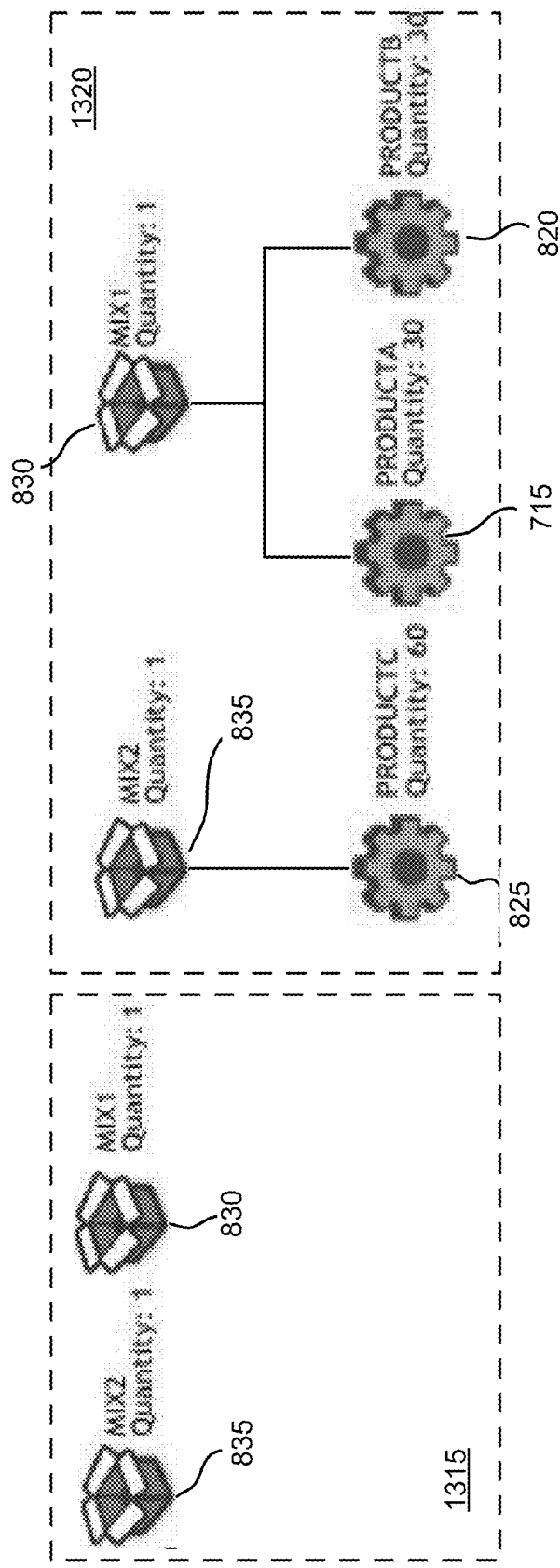
FIG. 13A illustrates a packing list that lists the lowest level shippable packages corresponding to the configured hierarchical inbound shipment order of FIGS. 6-12 according to one embodiment of the invention.
FIG. 13B illustrates an exemplary hierarchical graphical representation of the configured hierarchical inbound shipment order of FIGS. 6-12 according to one embodiment of the invention.
FIG. 13C illustrates an alternative exemplary hierarchical graphical representation of the configured hierarchical inbound shipment order of FIGS. 6-12 according to one embodiment of the invention

For example, FIG. 13A illustrates a packing list 1310 that lists the highest level shippable packages corresponding to the configured hierarchical shipment illustrated in FIGS. 6-12 (e.g., the item MIX1 (corresponding to the container object 830) with a quantity of 1 and the item MIX2 (corresponding to the container object 835) with a quantity of 1). According to one embodiment, the item name represents a SKU (stock-keeping unit) or other identifier that the warehouse uses to distinguish between items.

FIG. 13B illustrates an exemplary hierarchical graphical representation 1315 of the same hierarchical shipment from the point of view of the warehouse according to one embodiment of the invention. As illustrated in FIG. 13B, for each branch of the hierarchy, only the highest level shippable package or product is illustrated. Thus, a single container named MIX2 (corresponding with the container object 835) and a single container named MIX1 (corresponding with the container object 830) is illustrated in the hierarchical graphical representation 1315.

FIG. 13C illustrates an alternative exemplary hierarchical graphical representation 1320 of the same hierarchical shipment from the point of view of the warehouse according to one embodiment of the invention. As illustrated in FIG. 13C, the entire hierarchy down to the product level is illustrated in the hierarchical graphical representation 1320. Thus, a single container named MIX2 (corresponding with the container object 835) includes sixty products of product type PRODUCTC (corresponding with the product type object 825), and a single container named MIX1 (corresponding with the container object 830) includes thirty products of product type PRODUCTA (corresponding with the product type object 715) and thirty products of product type PRODUCTB (corresponding with the product type object 820).

In one embodiment, the packing list generation module 360 also generates step-by-step instructions for the warehouse to handle the corresponding inbound shipment. The following are sample step-by-step instructions: 1) take the box labeled SAMPLE off the pallet; 2) open the box labeled SAMPLE and take out three boxes; and 3) place these three boxes on the shelf. The step-by-step instructions may be augmented with a graphical representation of the hierarchy as exemplarily illustrated in FIG. 13B.

Figure 13D:
FIG. 13D illustrates exemplary step-by-step instructions for the warehouse to handle the inbound shipment corresponding to the configured hierarchical inbound shipment order of FIGS. 6-12 according to one embodiment of the invention.
Figure 13D:

FIG. 13D illustrates exemplary step-by-step instructions for the warehouse to handle the inbound shipment corresponding to the inbound shipment order configured in FIGS. 6-12 according to one embodiment of the invention. The step-by-step instructions 1330 include the following instructions: 1) count 1 MIX1, and enter into inventory; and 2) count 1 MIX2, and enter into inventory.

Figure 14:
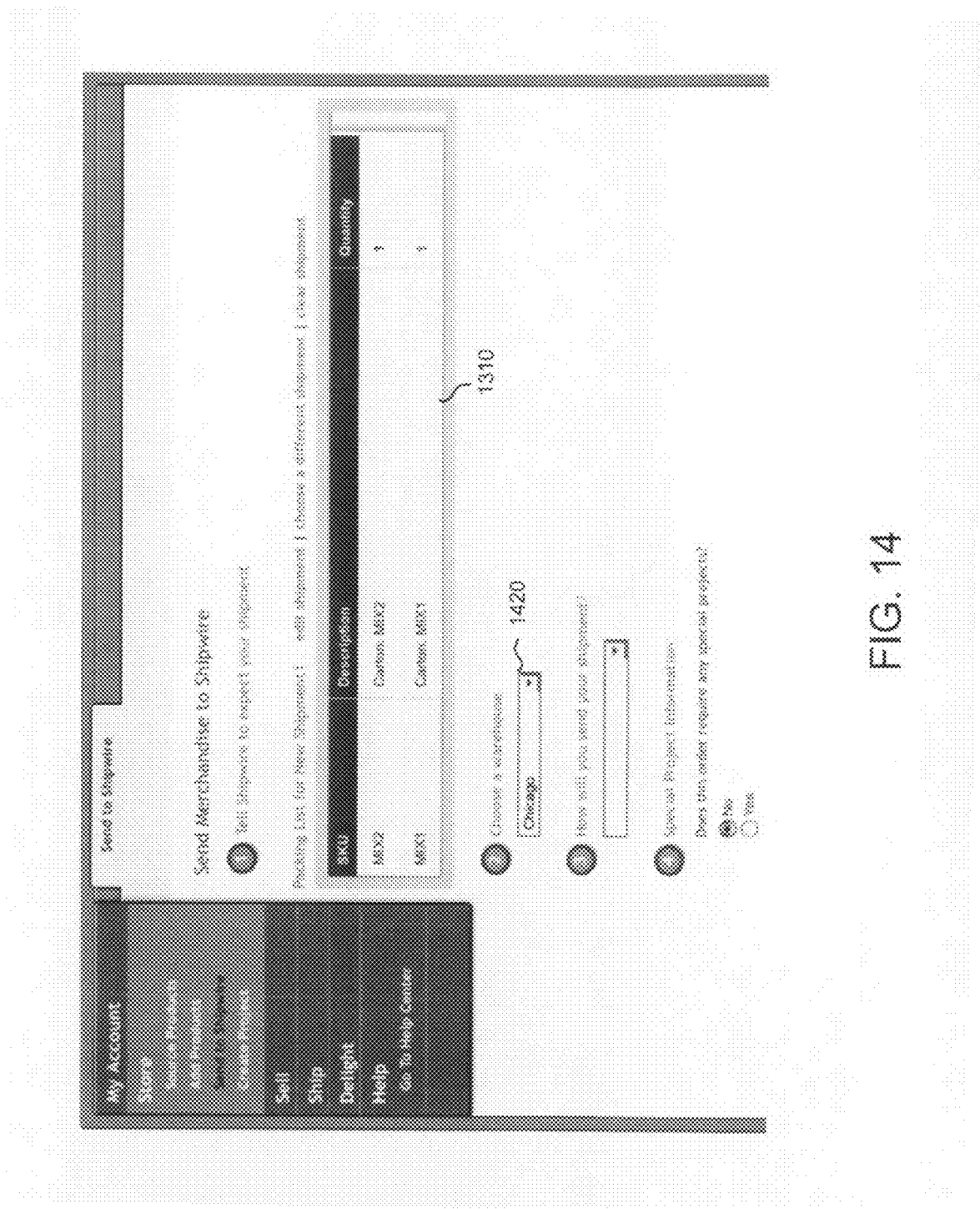
FIG. 14 illustrates a screen of the inbound shipment console for the merchants to select a warehouse to receive their inbound shipment according to one embodiment of the invention.

The generated packing list is communicated to the warehouse that is to receive the inbound shipment. FIG. 14 illustrates a screen of the inbound shipment console 540 for the merchants to select a warehouse to receive their inbound shipment. As illustrated in FIG. 14, part of the packing list 1310 is illustrated (this allows the merchants to review the packing list 1310 prior to it being communicated with a warehouse). The merchants may pick a warehouse with the warehouse drop down selection 1420 (e.g., the available warehouses are populated with the information stored in the warehouses table 230). After selecting the warehouse, the merchant may print and transmit the inbound shipment order to the warehouse. Additionally or alternatively, the order fulfillment server 100 communicates the configured inbound shipment order with the selected warehouse (e.g., with use of the warehouse portal application 120).

Inclusion of the hierarchical representation of the inbound shipment (e.g., the hierarchical representation 1320) and/or step-by-step instructions increases the accuracy of the services performed by the warehouse upon receipt of the inbound shipment. For example, in prior art implementations, the information communicated to the warehouse regarding the inbound shipment typically was only at the shippable package level (i.e., typically only a listing of the shippable packages was communicated to the warehouses). Thus, the level(s) of packaging that contain the shippable packages was not illustrated and/or the levels of packaging beneath the shippable packages (which could be shipped at a later time) is not communicated in prior art implementations. Since the warehouses in prior art implementations do not have complete information of the hierarchy, mistakes may be made when inventorying the order (e.g., the warehouses may have to break down multiple boxes to locate a matching SKU (stock-keeping unit) or other identifier listed in the packing list 1310 which may lead to incorrect containers being opened and inventoried if the inbound shipment has multiple levels). In contrast, the hierarchical graphical representation includes more complete information of the hierarchy that allows the warehouse personnel to quickly and graphically view the hierarchy to locate the proper shippable packages.

Additionally, the step-by-step instructions further reduce the mistakes during receipt of the inbound shipment by directing the warehouse personnel a step at a time to properly handle the inbound shipment (e.g., which containers to open, which containers to inventory, when to stop breaking down the order, etc.).

The merchants typically configure an inbound shipment order for each inbound shipment to a warehouse. Each inbound shipment order typically includes a packing list for the warehouse that lists the goods that the merchant wants to ship to customers. The warehouse typically uses the packing list when handling the corresponding inbound shipment (e.g., when unloading the inbound shipment). However, typically the inbound shipment order does not include instructions on how to locate those goods in the inbound shipment. As the package configuration of the inbound shipment becomes more complicated (e.g., goods being packaged in multiple or nested containers), the chance of the merchant making a mistake in the configuration of the inbound shipment order (e.g., providing the wrong level of shippable good) and the chance of the warehouse making a mistake in unpacking the corresponding inbound shipment (e.g., opening the wrong containers, etc.) increase.

In one embodiment, the hierarchical graphical representation of a configured hierarchical shipment includes only those levels and objects (container objects and/or product type objects) which should be handled by a warehouse. For example, if the merchant has indicated that the products at the product level are not shippable packages, then in this embodiment they will not appear on the hierarchical graphical representation of the configured hierarchical shipment.

Figure 15:
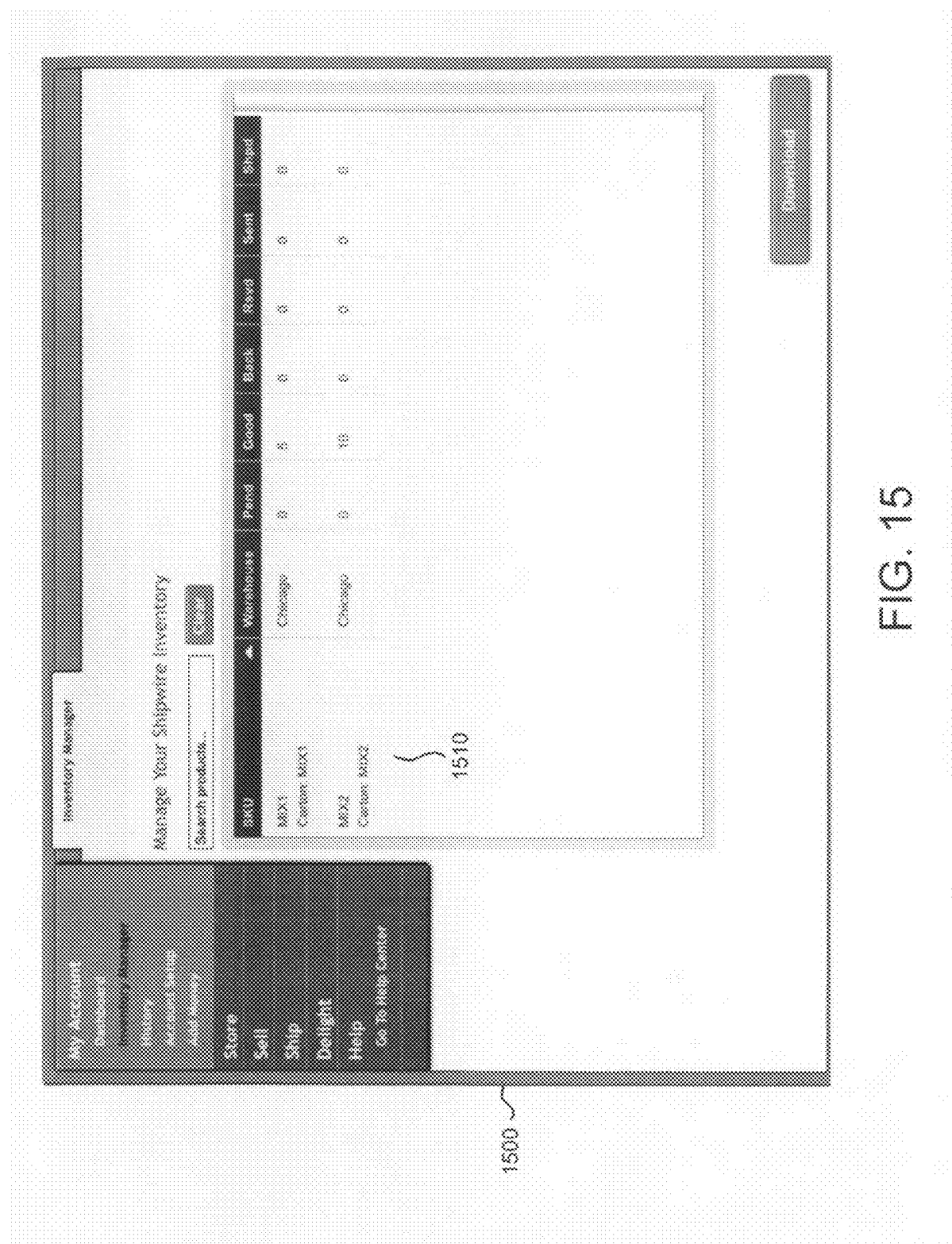
FIG. 15 illustrates a screen of the inventory console listing the inventory for a merchant according to one embodiment of the invention.

As previously described, the inventory module 325 of the order fulfillment server 100 maintains an inventory for each of the merchants. FIG. 15 illustrates a screen 1500 of the inventory console 545 listing the inventory for a merchant according to one embodiment. The inventory listed in FIG. 15 includes the information in the hierarchical inbound shipment described in FIGS. 6-12. For example, the inventory 1510 indicates that the Chicago warehouse has received 5 good containers named MIX1 (corresponding to the container object 830) and 10 good containers named MIX2 (corresponding to the container object 835).

Although not illustrated in FIG. 15, in some embodiments the order fulfillment server 100 maintains an inventory for each merchant of each shippable package (product and container) and products within each container that is a shippable package (regardless of the number of intervening containers). Using the above example, the inventory module 325 maintains an inventory for the merchant indicating that the Chicago warehouse includes 5 shippable packages MIX1, 10 shippable packages MIX2, 150 PRODUCTA (30 in each shippable package MIX1), 150 PRODUCTB (30 in each shippable package MIX1), and 600 PRODUCTC (60 in each shippable package MIX2). The inventory also indicates that the PRODUCTA, PRODUCTB, and PRODUCTC are not currently individually shippable since they are currently included within other shippable packages (e.g., the containers including these products must be broken down prior to being able to ship these products individually).

In some embodiments, the merchant may indicate for each shippable package that it can be broken down by the warehouse in the future without merchant intervention. For example, the merchant may indicate that one or more of the containers represented by the container object 835 can be broken down by the warehouse in the future without merchant intervention. This allows for greater flexibility and improved processing time in that the order fulfillment server 100 can instruct the warehouses to open one or more containers to fulfill an order without requiring additional merchant intervention. Thus, assuming that the merchant currently only has inventory in the Chicago warehouse, if the order fulfillment server 100 receives an outbound shipping order from the merchant for one or more PRODUCTC (currently included within the containers represented by the container object 835), the order fulfillment server 100 may instruct the warehouse to open one or more of those containers to fulfill the order of the PRODUCTC.

Figure 16A:
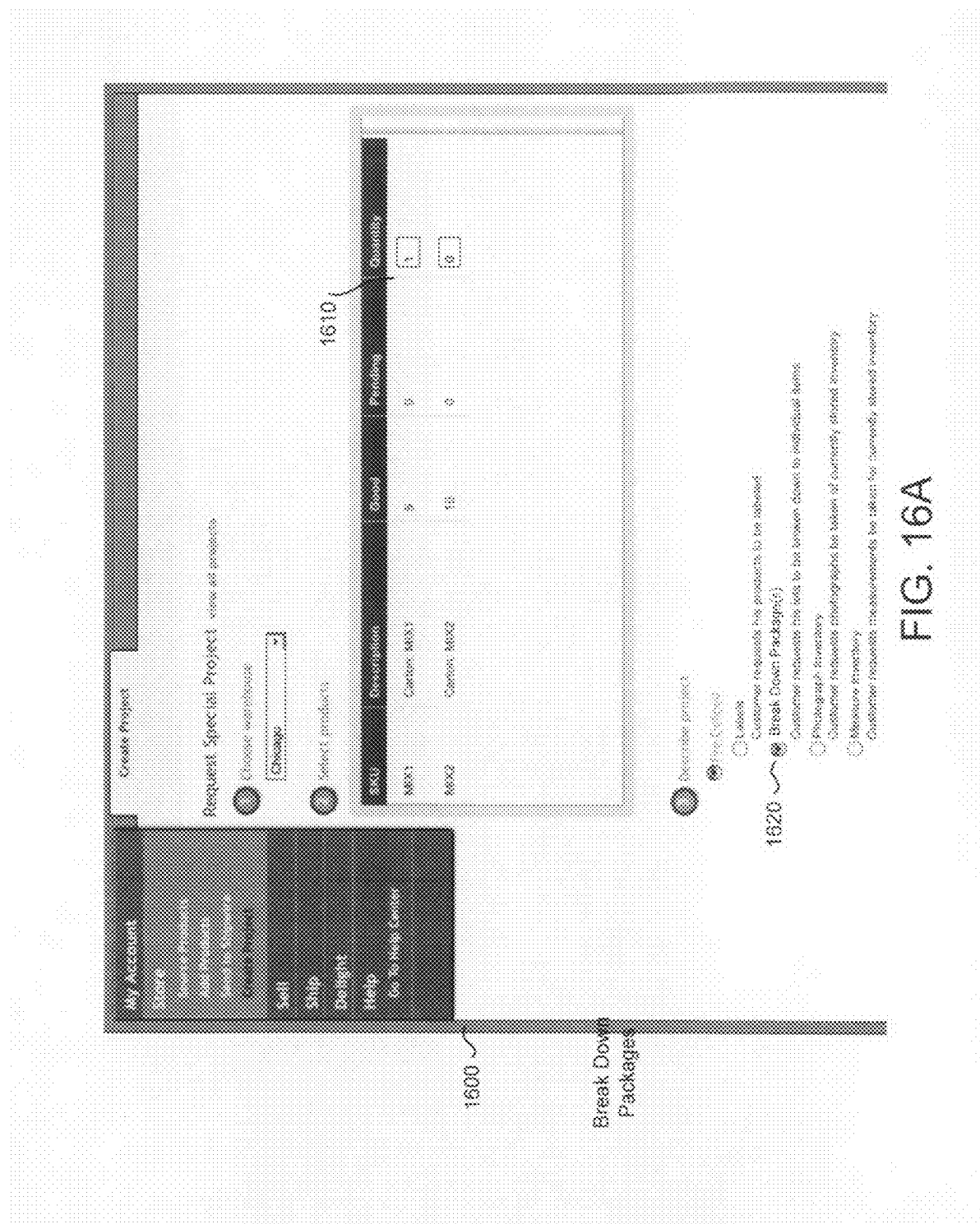
FIG. 16A illustrates a screen of the special projects console that allows the merchant to request a special project according to one embodiment of the invention.

As previously described, even though a container may originally be intended to be a shippable container package, the merchants may determine at a later time to have that container broken down and inventoried (e.g., split into one or more other shippable packages). In one embodiment, the merchant requests a shippable container package to be broken down with a special project request. FIG. 16A illustrates a screen 1600 of the special projects console 570 that allows the merchant to request a special project (e.g., request that labels be applied to the products, request that containers be broken down, request that photographs be taken of inventory, and request that measurements be taken for the inventory).

As illustrated in FIG. 16A, the special projects console 570 allows the merchant to select one or more items in their inventory and request a special project regarding that inventory. As illustrated in FIG. 16A, the special projects console 570 has received as input from the merchant a number 1 in the quantity field 1610 of the shippable container package MIX1 (corresponding with the container object 830) and a selection of the "Break Down Package(s)" button 1620 to request that the container corresponding to the shippable container package MIX1 be broken down (e.g., the package opened and its contents inventoried). As previously described, each shippable container package MIX1 includes 30 products of PRODUCTA and 30 products of PRODUCTB. The request will be communicated to the selected warehouse (e.g., transmitted via email, text message, faxed, placed on the warehouse portal application 120, etc.) by the order fulfillment server 100.

Figure 16B:
FIG. 16B illustrates exemplary step-by-step instructions for the warehouse to break down a container according to one embodiment of the invention.
Figure 16B:
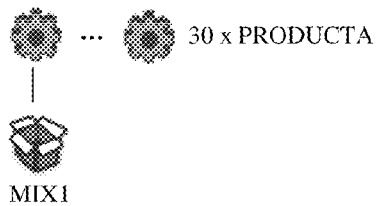
Figure 16B:
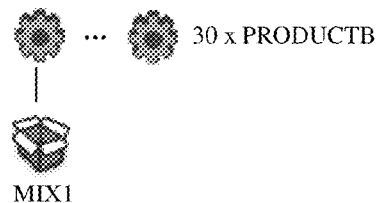

In some embodiments, the packing list generation module 360 generates step-by-step instructions for the warehouse reflecting the request to break down a container stored at the warehouse. FIG. 16B illustrates exemplary step-by-step instructions for the warehouse to break down a container according to one embodiment of the invention. In one embodiment, the step-by-step instructions 1650 are generated in response to the merchant requesting that the shippable container package MIX1 be broken down as described in FIG. 16A. The step-by-step instructions 1650 include the following instructions: 1) Pull 1 MIX1 from inventory; 2) Break 1 MIX 1 into 30 PRODUCTA and inventory; and 3) Break 1 MIX 1 into 30 PRODUCTB and inventory. Thus, if the instructions 1650 are followed, one of the MIX1 containers will be removed from inventoried and its contents (30 PRODUCTA and 30 PRODUCTB) will be inventoried.

Figure 17:
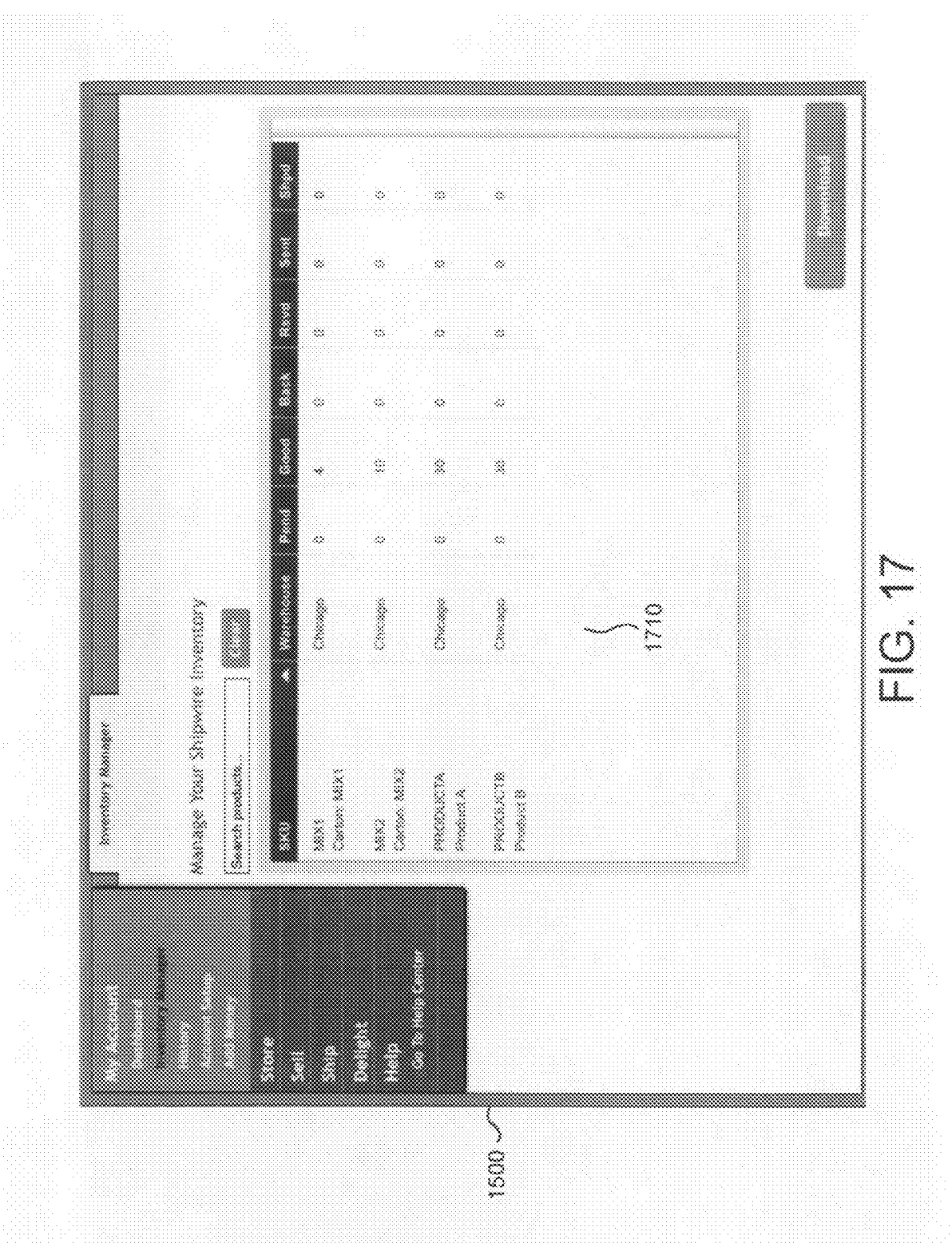
FIG. 17 illustrates the screen of the inventory console for the merchant after the request generated in FIG. 16A has been processed according to one embodiment of the invention.

FIG. 17 illustrates the inventory screen 1500 of the inventory console 545 for the merchant after the request generated in FIG. 16A has been processed (e.g., after the warehouse has performed the request and broken down the shippable container package MIX1 (corresponding with the container object 830)). As illustrated in FIG. 17, the inventory for the merchant has been updated to reflect that one of the shippable container packages named MIX1 has been opened and its contents inventoried (30 products of PRODUCTA and 30 products of PRODUCTB).

While the FIGS. 6-13D describe a relatively simple hierarchical inbound shipment order, it should be understood that the hierarchy may include many different levels. For example, FIG. 18 is another example of a hierarchical inbound shipment order which has been configured using the interactive hierarchical inbound shipment order configuration tool 195.

Figure 18:
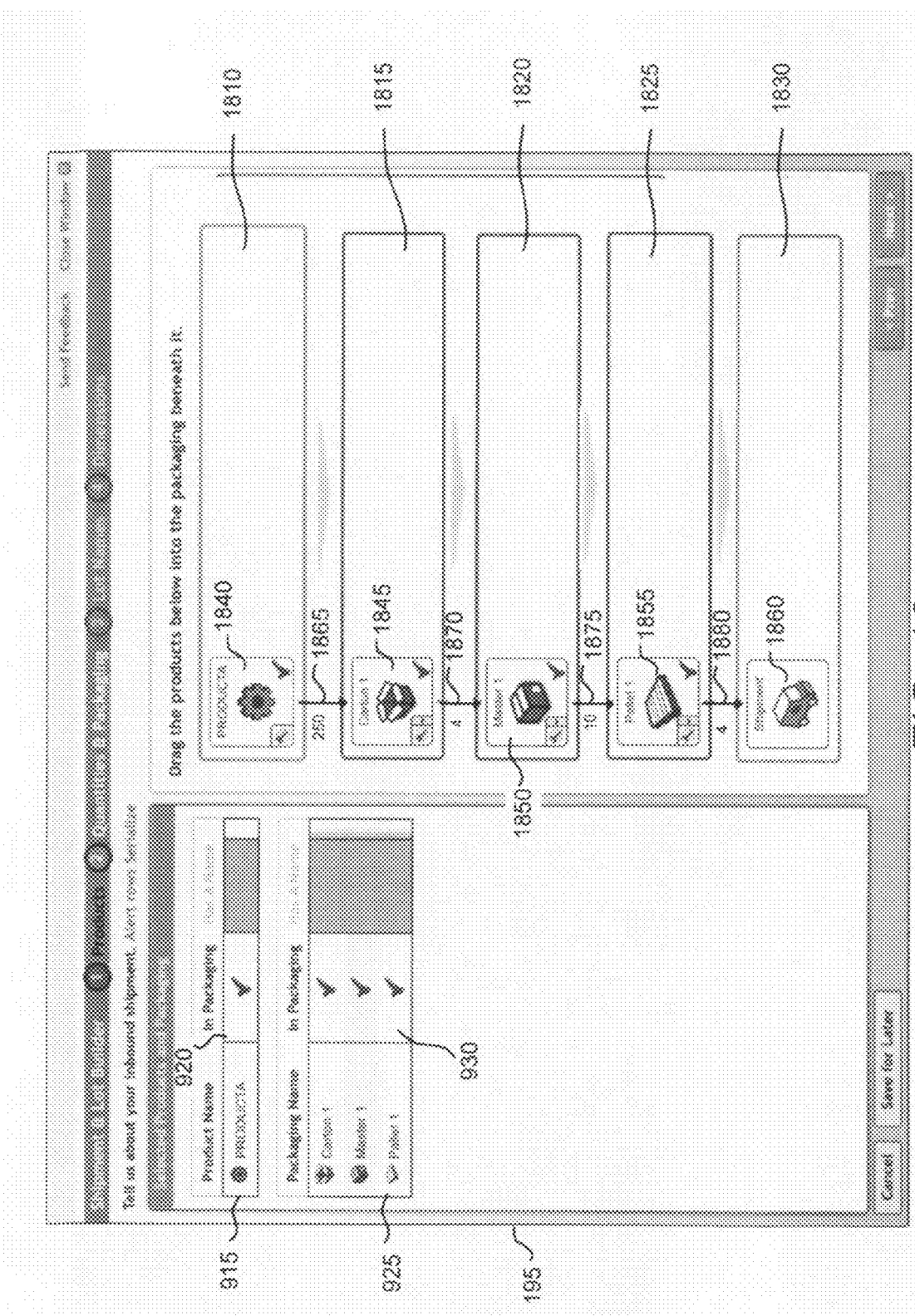
FIG. 18 is another example of a hierarchical inbound shipment order which has been configured using the interactive hierarchical inbound shipment order configuration tool according to one embodiment of the invention.

As illustrated in FIG. 18, the hierarchy of this inbound shipment order includes the product level 1810, the container levels 1815, 1820, and 1825, and the inbound shipment transportation level 1830. The product type object 1840 is associated with the container object 1845 of the container level 1815 (association 1865). The association 1865 represents that 250 products corresponding to the product type object 1840 will be included in the physical container corresponding to the container object 1845. Although not illustrated in FIG. 18, in some embodiments of the invention the product type object 1840 may also be associated with different container objects at different levels (e.g., the container object 1855 of the container level 1825) and/or with the shipment transportation object 1860 of the inbound shipment transportation level 1830.

The container object 1845 of the container level 1815 is associated with the container object 1850 of the container level 1820 (association 1870). The association 1870 represents that four containers corresponding to the container object 1845 will be included in each container corresponding to the container object 1850. The container object 1850 of the container level 1820 is also associated with the container object 1855 of the container level 1825 (association 1875). The association 1875 represents that ten containers corresponding to the container object 1850 will be included in each container corresponding to the container object 1855. The container object 1855 of the container level 1825 is also associated with the shipment transportation object 1860 of the inbound shipment transportation level 1830 (association 1880). The association 1880 represents that there will be four containers corresponding to the container object 1855 on the transport.

Although not illustrated in FIG. 18, the interactive hierarchical inbound shipment order configuration tool 195 has also received indication from the merchant that that the container corresponding to the container object 1850 is a shippable container package while the containers corresponding to the container objects 1845 and 1855 are not shippable container packages. Since the containers corresponding to the container objects 1845 and 1855 are not shippable container packages, the merchant has configured the inbound shipment order so that the warehouse will open the containers corresponding to the container objects 1845 and 1855 and inventory their contents.

In some embodiments, the interactive hierarchical inbound shipment order configuration tool 195 allows for merchants to select individual ones of a container object as representing a shippable package. For example, with reference to FIG. 8, in addition to displaying a window that provides the shippable package indication box 845, the interactive hierarchical inbound shipment order configuration tool 195 may query or allow the user to provide the number of containers which are or which are not shippable packages that the container object represents (e.g., the tool allows merchants to indicate that individual ones of the physical containers presented by the container object 1850 is, or is not, a shippable package). For purposes of the following examples, it is assumed that the merchant has indicated that all but one of the physical containers corresponding to the container object 1850 is a shippable package (i.e., one out of the 40 physical containers corresponding to the container object 1850 is not a shippable package).

The configuration of the hierarchical inbound shipment affects the amount of money for the warehouse to receive and process the inbound shipment. For example, the warehouses typically charge for each item they are inventorying (e.g., each shippable package). Thus, if the merchant configures the hierarchical inbound shipment order as 1000 individual products (e.g., no shippable container packages but all shippable product packages), then the warehouse that receives the order will typically charge to receive and process 1000 individual items. The owner/operator of the order fulfillment system 190 may either charge the merchants immediately, absorb the receipt and processing fee, or charge the merchant a security deposit that incentives the merchant to lower the shipment (e.g., by including individual items into a shippable container package as will be described below).

If the merchant configures the hierarchical inbound shipment order as including the 1000 products within one shippable container package, then the warehouse that receives the order typically changes for only a receipt and processing of one item. If the merchant desires to have the box broken down at a later date, the warehouses may charge either an hourly rate or a per/item rate. Regardless of how the merchant is charged, it should be understood that there is a "cash flow" savings by deferring a break and inventory until a product is ready to be shipped out.

In some embodiments, the hierarchical inbound shipment order configuration tool 195 includes an inbound shipment order cost meter to inform the merchants in real-time an estimate of the cost required to receive and process inbound shipments at the warehouses given a current hierarchical inbound shipment order (e.g., an estimate that reflects the cost for the warehouses to receive and inventory each shippable package upon receipt). The cost to receive and process inbound shipments typically is a flat per shippable package cost (e.g., 1 dollar per shippable package).

In some embodiments, the interactive hierarchical inbound shipment order configuration tool 195 includes an outbound shipping cost meter which informs the merchants in real-time of an estimate of the outbound shipping costs of the warehouse given the current configuration of the hierarchical inbound shipment order (e.g., an estimate that reflects the cost for the warehouses to process each shippable package and/or ship the shippable packages in the hierarchical inbound shipment order).

In some embodiments, the interactive hierarchical inbound shipment order configuration tool 195 includes an inbound shipment receiving liability meter to inform the merchants in real-time the deposit amount required given a current hierarchical inbound shipment order. For example, an inbound shipment with many shippable packages (e.g., 1000 individual shippable packages) may require a larger deposit than an inbound shipment with relatively few shippable packages (e.g., 10 shippable packages).

Although not illustrated in FIG. 18, in some embodiments of the invention, the interactive hierarchical inbound shipment configuration tool 195 allows merchants to create multiple associations between one of the container objects and multiple different ones of the container objects at different levels. For example, in addition to the association 1870, the merchant may create an association between the container object 1845 and the container object 1855 (and indicate an amount as previously described).

Figures 19A, 19B, 19C:
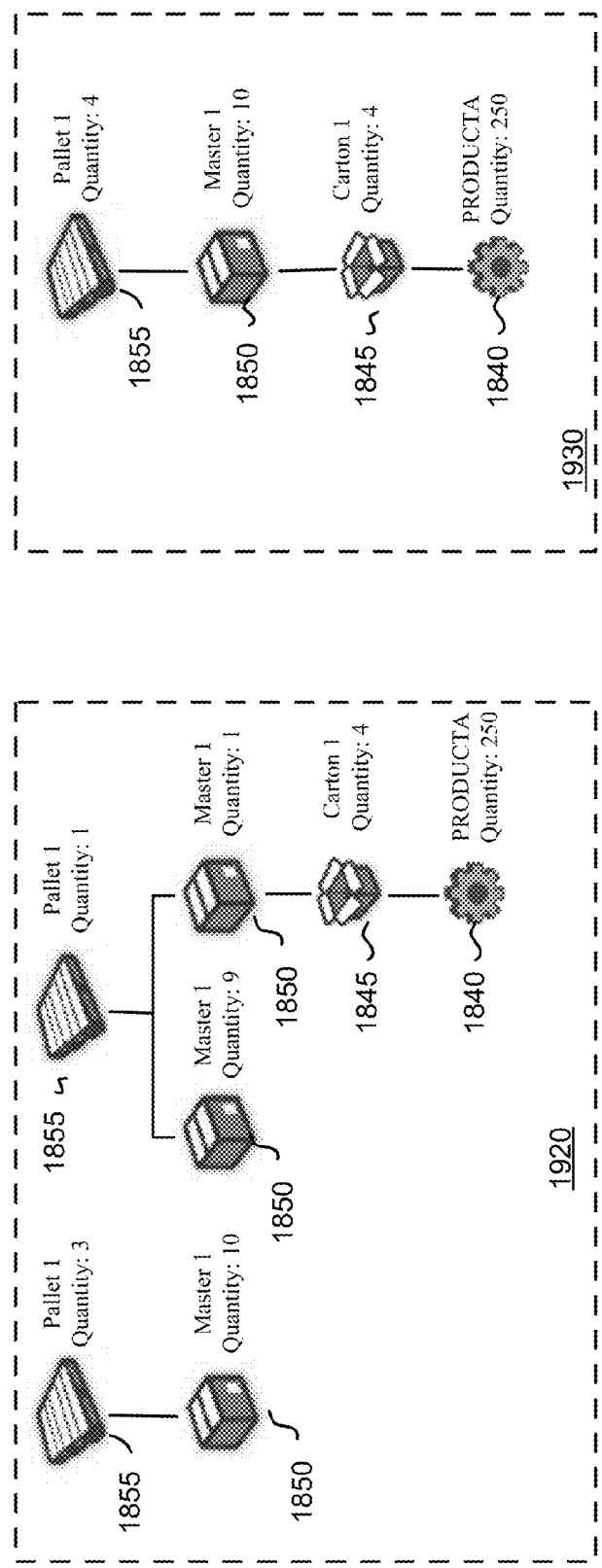
FIG. 19A illustrates the packing list generated by the packing list generation module based on the configured hierarchical inbound shipment of FIG. 18 according to one embodiment of the invention.
FIG. 19B illustrates an exemplary hierarchical graphical representation of the configured hierarchical inbound shipment order of FIG. 18 according to one embodiment of the invention.
FIG. 19C illustrates an alternative exemplary hierarchical graphical representation of the configured hierarchical inbound shipment order of FIG. 18 according to one embodiment of the invention.

FIG. 19A illustrates the packing list 1910 generated by the packing list generation module 360 based on the configured hierarchical inbound shipment of FIG. 18. As illustrated in FIG. 19A, the packing list 1910 includes the item MASTER1 (corresponding to the container object 1850) with a quantity of 39) and the item PRODUCTA (corresponding to the product type object 1840) with a quantity of 1000.

FIG. 19B illustrates an exemplary hierarchical graphical representation 1920 of the hierarchical inbound shipment order of FIG. 18 from the point of view of the warehouse according to one embodiment of the invention. As illustrated in FIG. 19B, for each branch of the hierarchy, only the highest level shippable container package or shippable product package is illustrated. For example, in one branch are three pallets (corresponding with the container object 1855) each containing ten master containers (corresponding with the container object 1850). In another branch, a single pallet (corresponding with the container object 1855) includes ten master containers (corresponding with the container object 1850). Since one of the physical containers represented by the container object 1850 is not a shippable container package, one of the container object further branches off to illustrate that it includes four cartons (corresponding with the container object 1845) and each carton includes 250 PRODUCTA (corresponding with the product type object 1840).

FIG. 19C illustrates an alternative exemplary hierarchical graphical representation of the hierarchical inbound shipment order of FIG. 18 according to one embodiment of the invention. As illustrated in FIG. 19C, the entire hierarchy of the hierarchical inbound shipment is included in the hierarchical graphical representation 1930. Thus, four pallets (each corresponding to the container object 1855) are directly located on the inbound shipment transportation vehicle, and each include ten master cartons (each corresponding to the container object 1850), and each master carton includes four cartons (each corresponding to the container object 1845), and each carton includes 250 PRODUCTA (corresponding to the product type object 1840).

Figure 20:
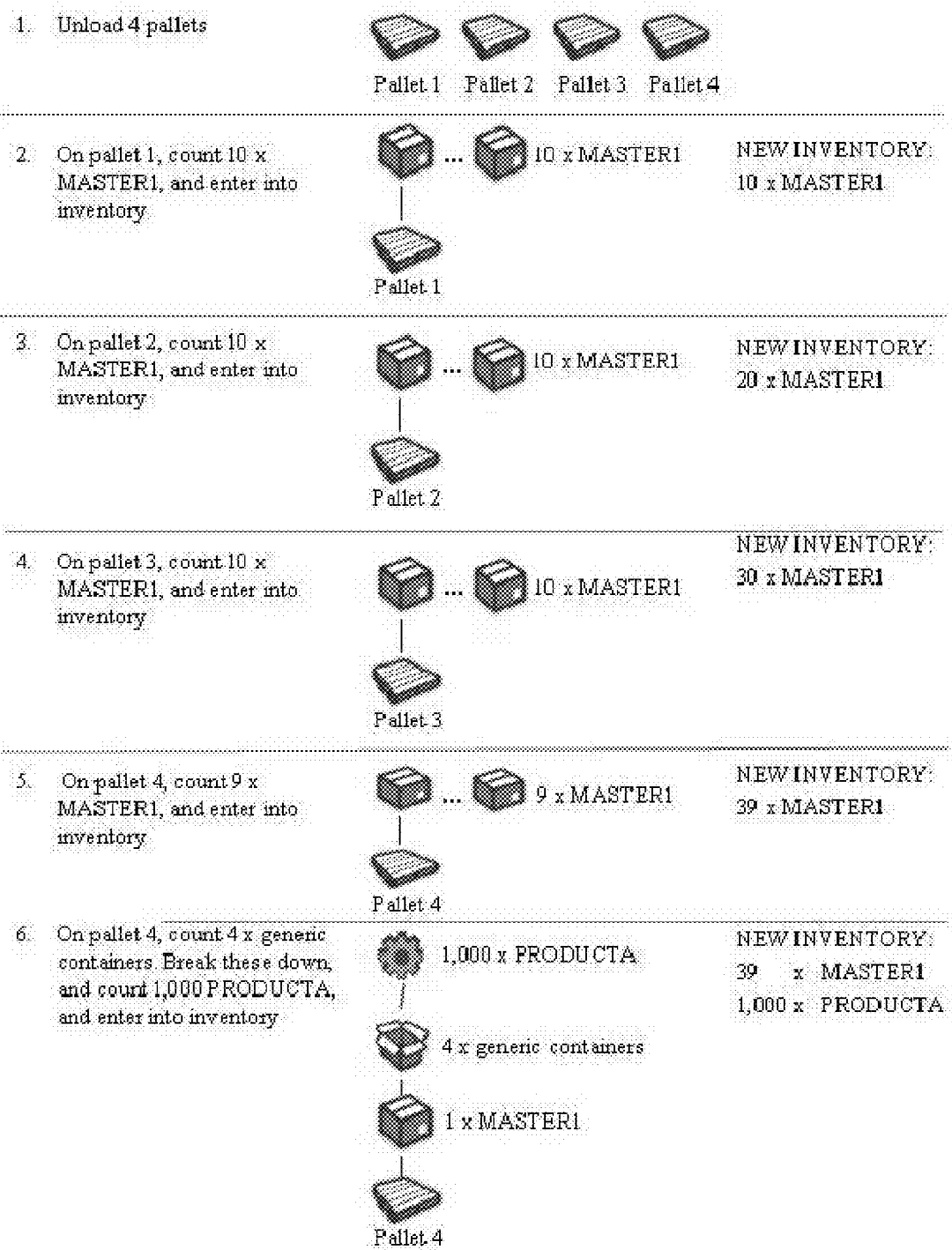
FIG. 20 illustrates exemplary step-by-step instructions for a warehouse to handle the inbound shipment corresponding to the configured hierarchical inbound shipment order of FIG. 18 according to one embodiment of the invention.

As described above, the packing list generation module 360 may also generate step-by-step instructions for handling the inbound shipment for the warehouse that will receive the inbound shipment. FIG. 20 illustrates exemplary step-by-step instructions for handling the inbound shipment of FIG. 18 according to one embodiment of the invention. The step-by-step instructions 2010 include the following instructions: 1) unload four pallets; 2) on pallet one, count ten MASTER1 and enter into inventory; 3) on pallet two, count ten MASTER 1 and enter into inventory; 4) on pallet three, count ten MASTER1 and enter into inventory; 5) on pallet four, count nine MASTER1 ad enter into inventory; and 6) on pallet four, count four generic containers, break these down, and count 1,000 PRODUCTA and enter into inventory.

Figure 21:
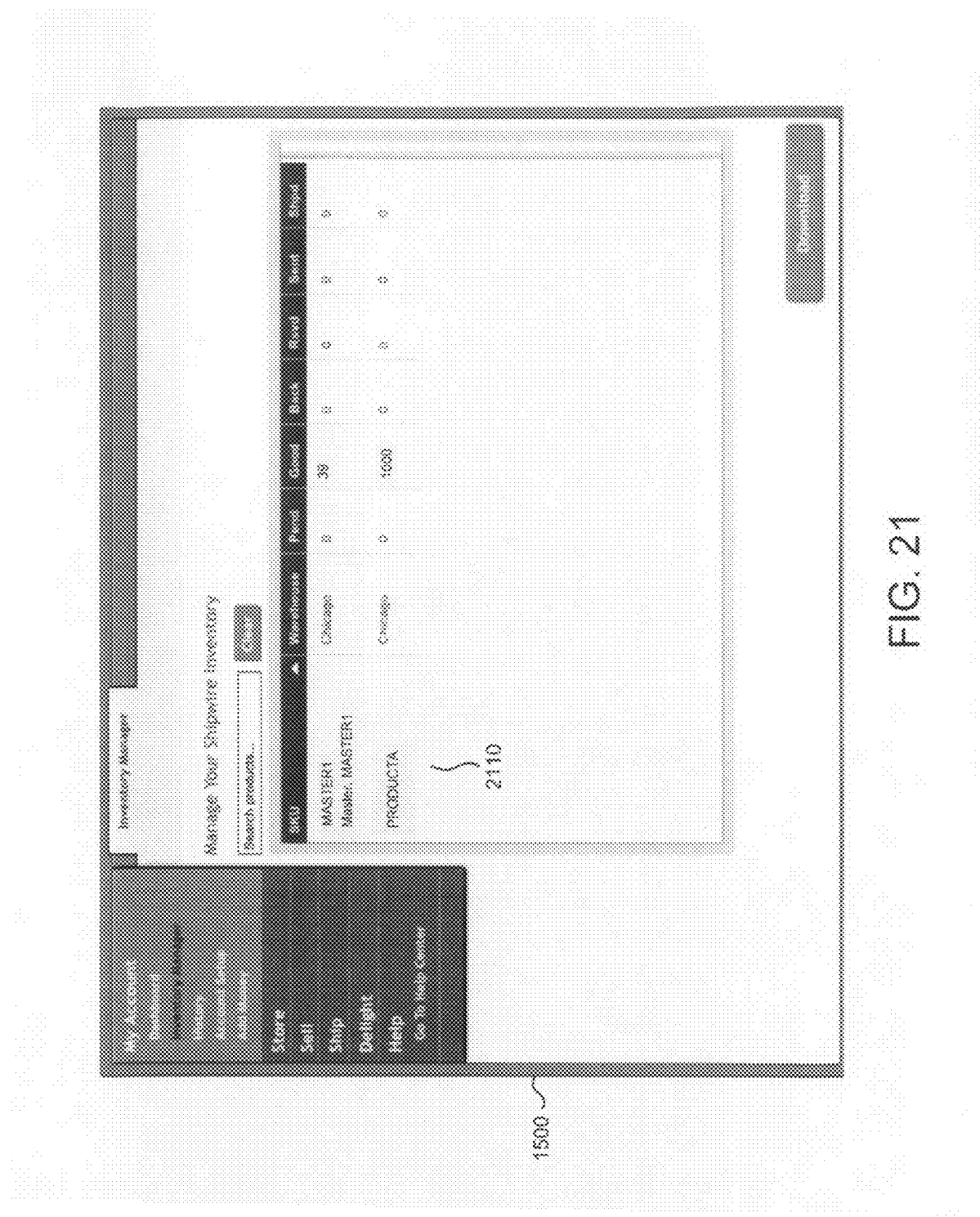
FIG. 21 illustrates a screen of the inventory console listing the inventory for a merchant reflecting the inbound shipment according to one embodiment of the invention.

As previously described, the inventory module 325 of the order fulfillment server 100 maintains an inventory for each of the merchants. FIG. 21 illustrates a screen 1500 of the inventory console 545 listing the inventory for a merchant reflecting the inbound shipment according to one embodiment of the invention. The inventory listed in FIG. 21 includes the information in the hierarchical inbound shipment described in FIGS. 18-20. For example, the inventory 2110 indicates that the Chicago warehouse has received 39 good containers named MASTER1 (corresponding to the container object 1850) and 1000 good products named PRODUCTA (corresponding to the product type object 1840).

Figure 22:
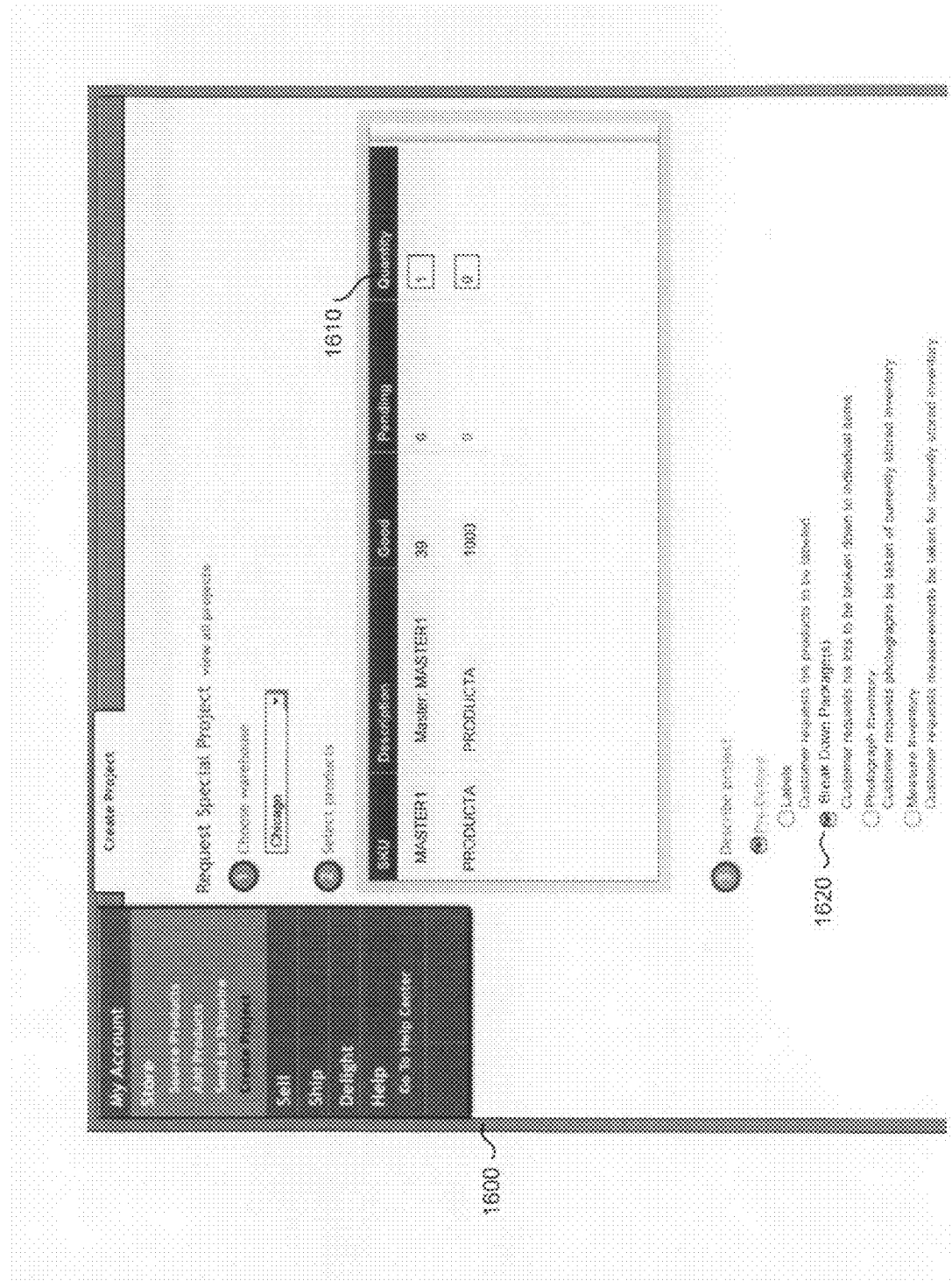
FIG. 22 illustrates a screen of the special projects console that allows the merchant to request a special project according for the inventory illustrated in FIG. 21 according to one embodiment of the invention.

FIG. 22 illustrates a screen 1600 of the special projects console 570 that allows the merchant to request a special project for the inventory illustrated in FIG. 21. As illustrated in FIG. 22, the special projects console 570 has received as input from the merchant a number 1 in the quantity field 1610 of the shippable container packager MASTER1 (which corresponds with the container object 1850) and a selection of the "Break Down Package(s)" button to request that one container corresponding to the shippable container package MASTER1 be broken down (e.g., the container opened and its contents inventoried). The request will be communicated to the selected warehouse (e.g., transmitted via email, text message, faxed, placed on the warehouse portal application 120, etc.) by the order fulfillment server 100.

Figure 23:
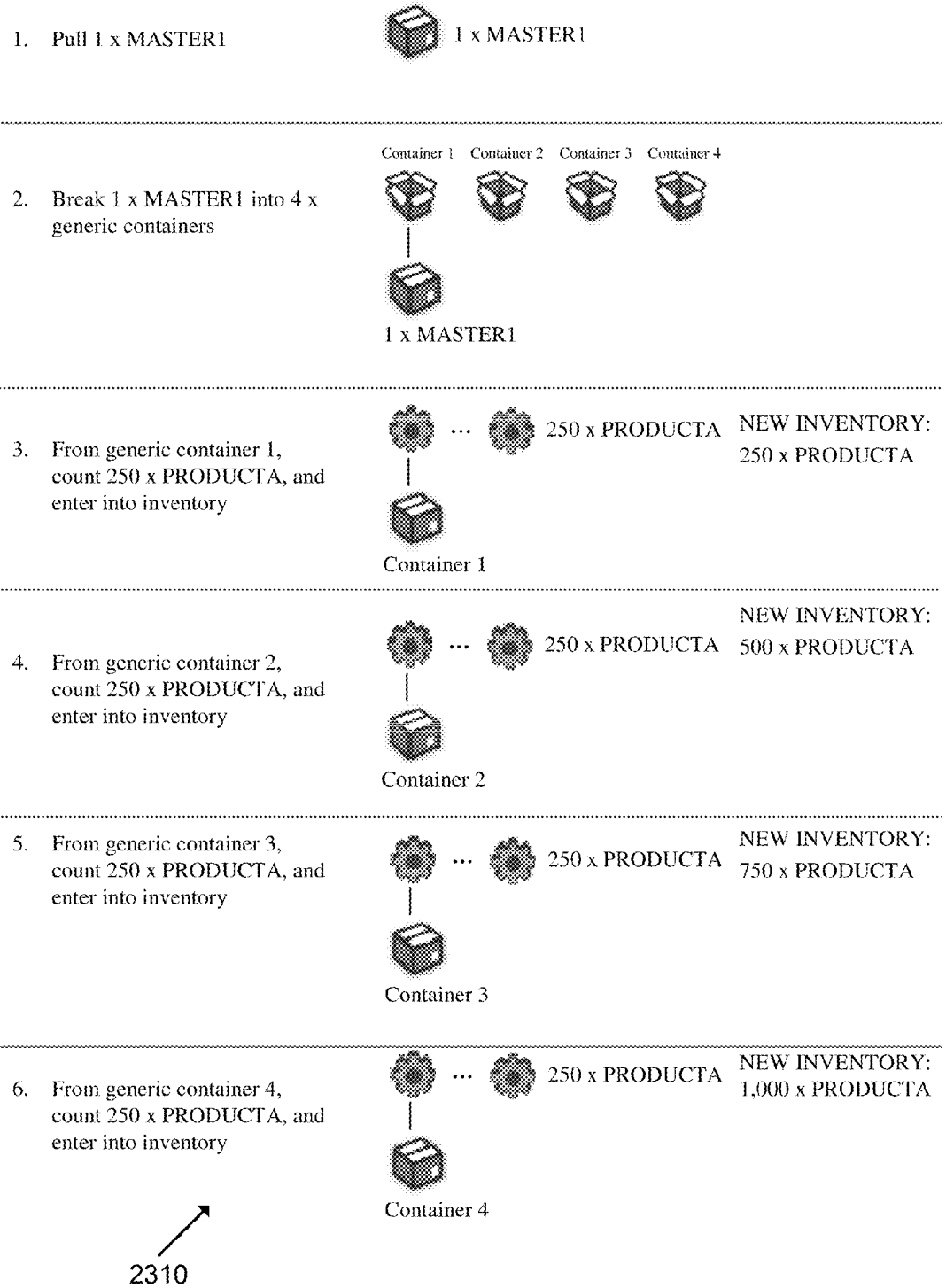
FIG. 23 illustrates exemplary step-by-step instructions for the warehouse to break down a container corresponding to the request in FIG. 22 according to one embodiment of the invention.

In some embodiments, the packing list generation module 360 generates step-by-step instructions for the warehouse reflecting the request to break down a container stored at the warehouse. FIG. 23 illustrates exemplary step-by-step instructions for the warehouse to break down a container corresponding to the request in FIG. 22 according to one embodiment of the invention. In one embodiment, the step-by-step instructions 2310 are generated in response to the merchant requesting that the shippable container package MASTER1 be broken down as described in FIG. 22. The step-by-step instructions 2310 include the following instructions: 1) Pull 1 MASTER1 from inventory; 2) Break 1 MASTER1 into 4 generic containers; 3) From generic container 1, count 250 PRODUCTA, and enter into inventory; 4) From generic container 2, count 250 PRODUCTA and enter into inventory; 5) From generic container 3, count 250 PRODUCTA, and enter into inventory; and 6) From generic container 4, count 250 PRODUCTA, and enter into inventory PRODUCTA. Thus, if the instructions 1650 are followed, one of the MASTER1 containers will be removed from inventoried and its contents (e.g., 1000 PRODUCTA) will be inventoried.

Figure 24:
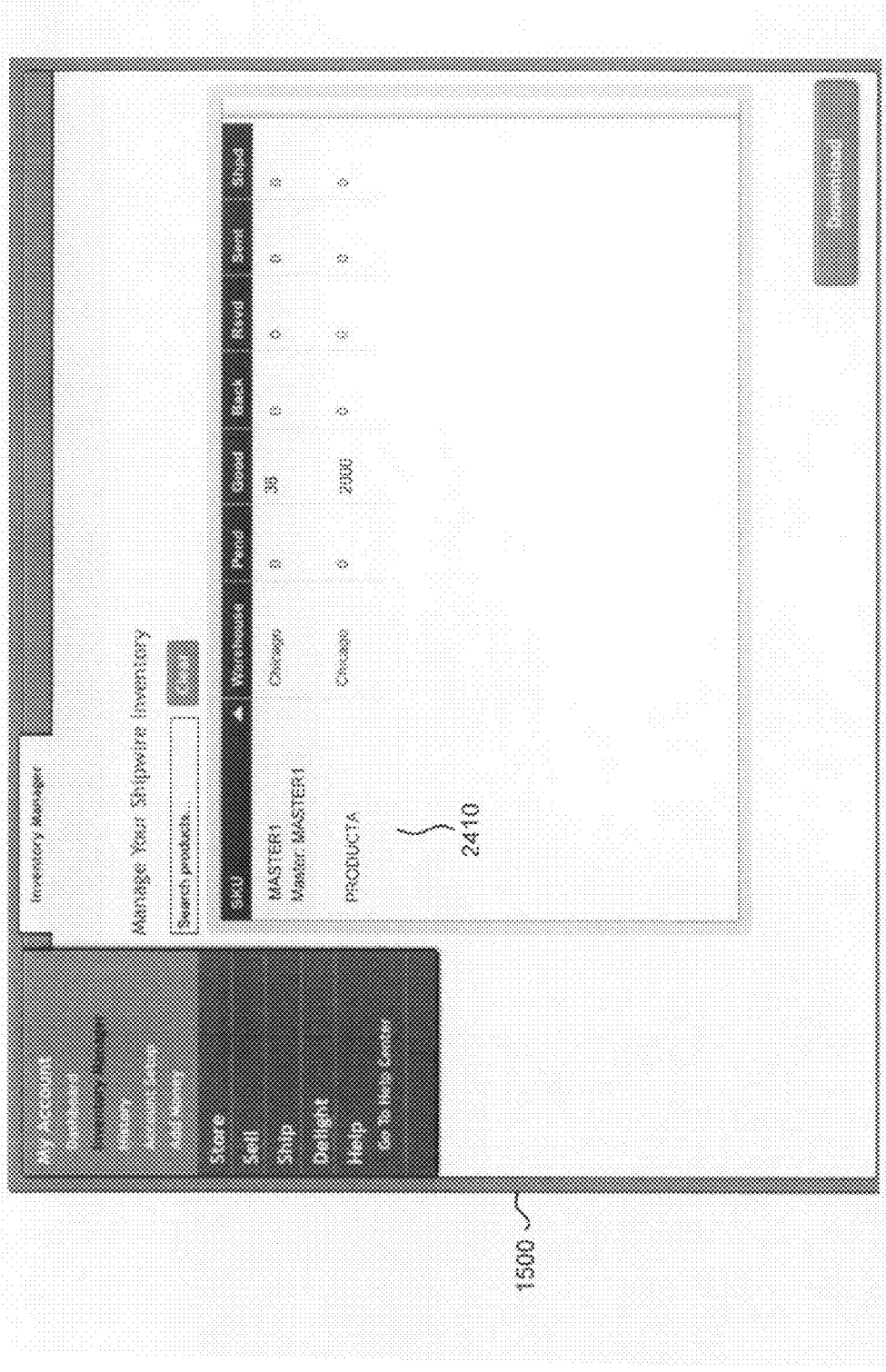
FIG. 24 illustrates the screen of the inventory console for the merchant that reflects the request illustrated in FIGS. 22 and 23 according to one embodiment of the invention.

FIG. 24 illustrates the inventory screen 1500 of the inventory console 545 for the merchant to reflect the request illustrated in FIGS. 22 and 23 (e.g., after the warehouse has performed the request and broken down the shippable container package MASTER1 (corresponding with the container object 1850)). As illustrated in FIG. 24, the inventory for the merchant has been updated to reflect that one of the shippable container packages named MASTER1 has been opened and its contents inventoried (thus, the number of good MASTER1 has been modified from 39 to 38, and the number of good PRODUCTA has been modified from 1000 to 2000).

Figure 25:
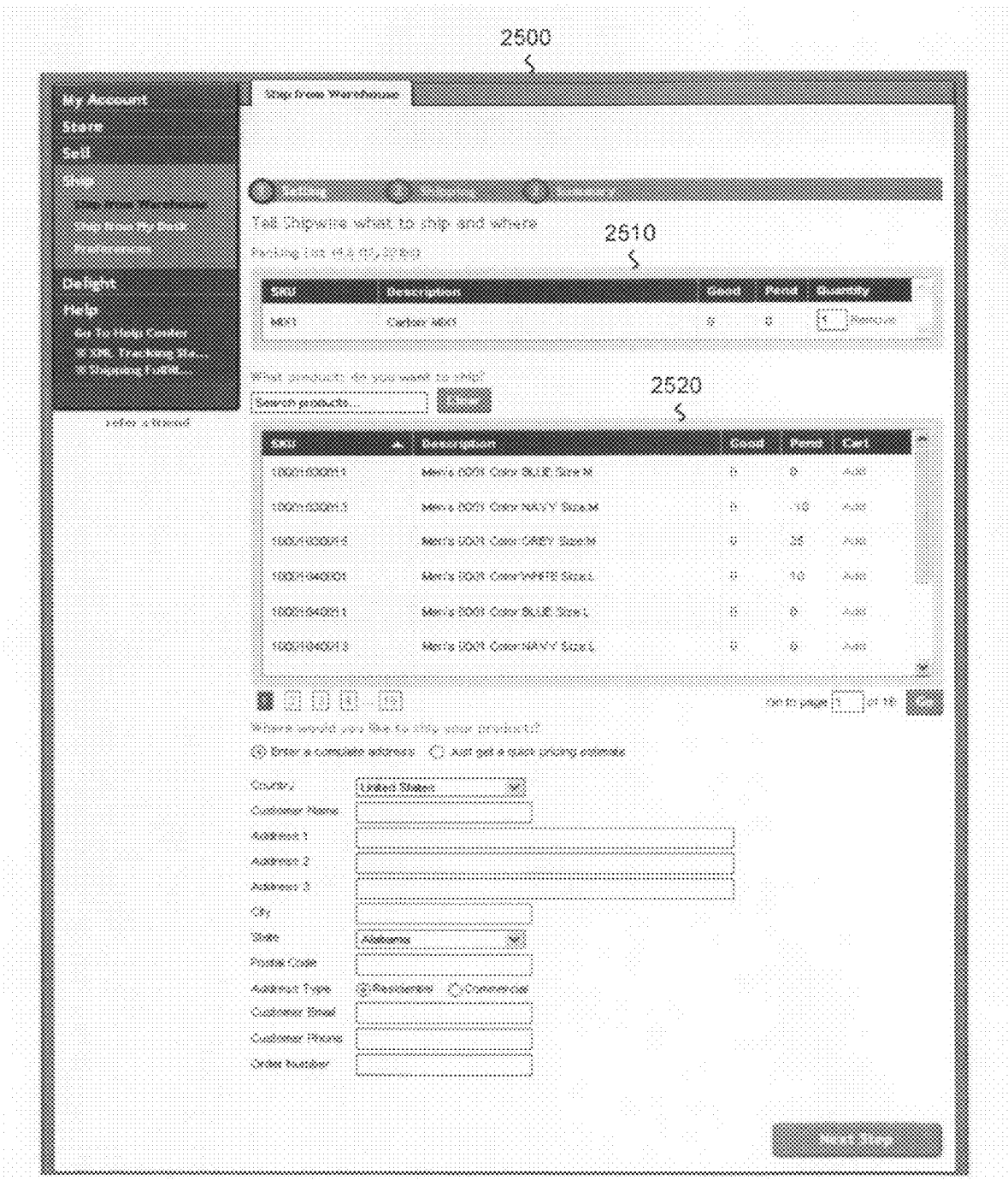
FIG. 25 illustrates an exemplary outbound shipping order screen that allows merchants to configure outbound shipping orders according to one embodiment of the invention.

FIG. 25 illustrates an exemplary outbound shipping order screen 2500 that allows merchants to configure outbound shipping orders. As illustrated in FIG. 25, the outbound shipping order screen 2500 includes the outbound shipping cart 2510 which lists the type and amount of packages to be sent. The package list 2520 lists the available packages that can be shipped to a customer. The outbound shipping order screen 2500 also allows merchants to input the shipping address of the customer.

Figure 26:
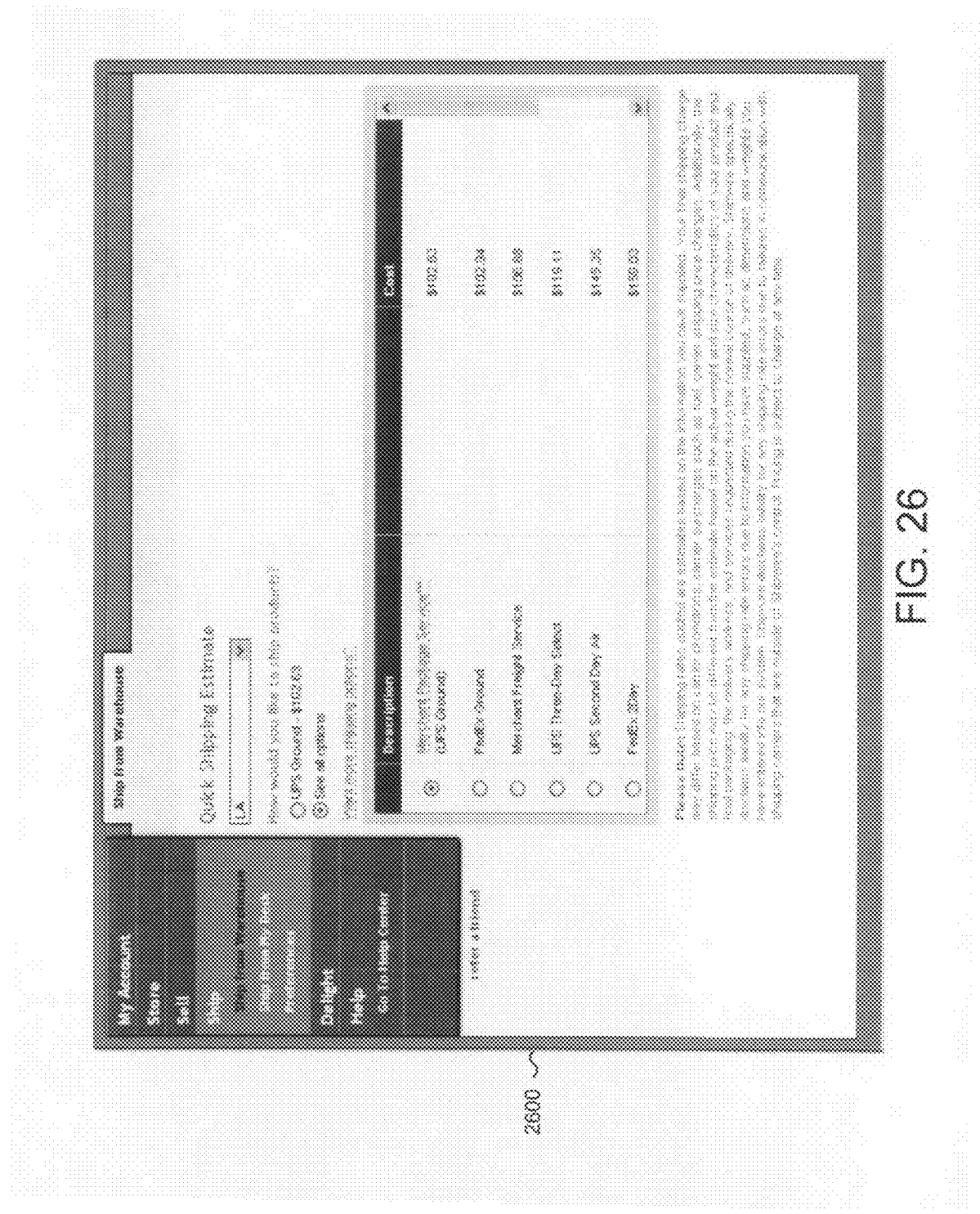
FIG. 26 illustrates an exemplary outbound shipping options screen that allows merchants to configure shipping options for the outbound shipping order illustrated in FIG. 25 according to one embodiment of the invention.

FIG. 26 illustrates an exemplary shipping options screen 2600 that allows merchants to configure the shipping option (e.g., select between multiple shipping providers/carriers) for the outbound shipping order illustrated in FIG. 25 according to one embodiment of the invention.

Figure 27:
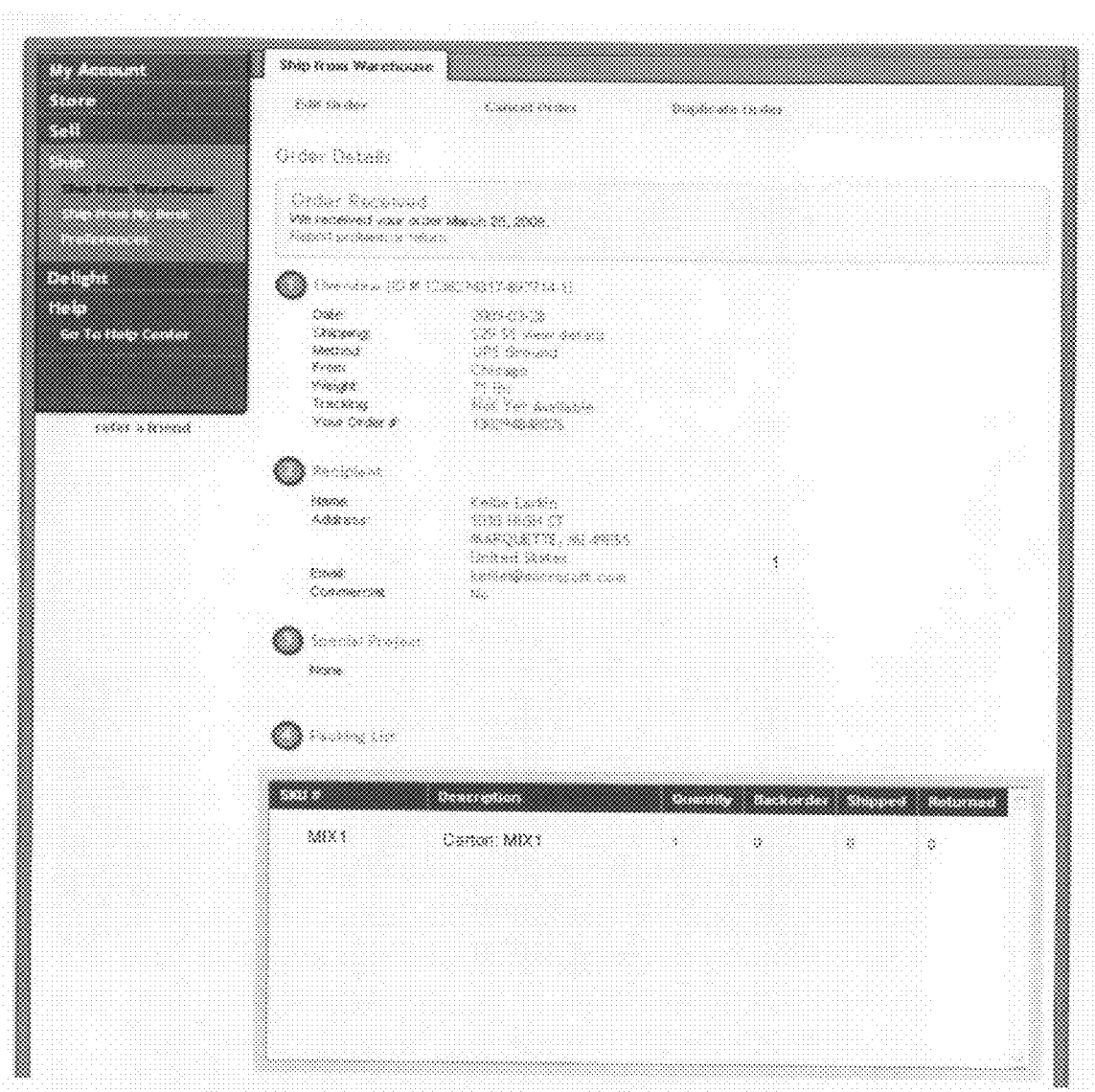
FIG. 27 illustrates an outbound shipping order confirmation screen which summarizes the outbound shipping order of FIGS. 25-26 according to one embodiment of the invention.

FIG. 27 illustrates an outbound shipping order confirmation screen which summarizes the outbound shipping order of FIGS. 25-26 including the type and amount of product, the shipping address, the carrier and shipping option selected, etc.

In some embodiments of the invention, the interactive hierarchical inbound shipment configuration tool 195 allows merchants to select any individual ones of the physical containers represented by each container object and/or physical products represented by each product type object to represent shippable packages. For example, instead of each of the 10 containers corresponding to the container object 1850 being a shippable package, the merchant can select individual ones of the 10 containers corresponding to the container object 1850 to be a shippable package. In some embodiments of the invention, the interactive hierarchical inbound shipment configuration tool 195 allows merchants to designate individual associations as representing containers or products that are shippable packages. For example, with reference to FIG. 18, the merchant may indicate that the physical products represented by the association 1890 are each shippable product packages, while the physical products represented by the associations 1865 and 1890 are not shippable product packages.

According to one embodiment, the packing list generation module 360 may generate instructions for handling the inbound shipment that deviate from what the merchant requests. For example, although in the above example the merchant has requested that the warehouse open the containers corresponding to the container objects 1850 and 1855 and inventory their contents, the generated instructions for the warehouse may indicate something different (e.g., defer opening the containers for a later date, inventory only a portion of the containers, predicatively break down the containers, etc.). In one embodiment, the packing list generation module 360 determines to deviate from what is requested when generating the instructions based on the inbound shipment history and outbound shipping history of the merchant.

While embodiments of the invention describe an inbound shipment transportation level and creating associations between container objects and/or product type objects with a inbound shipment transportation object of the inbound shipment transportation level, in alternative embodiments of the invention an inbound shipment transportation level is not used.

While embodiments of the invention describe that the merchants configure the hierarchical inbound shipment orders starting from the leaf nodes (the product type objects) and working through the hierarchy to the root node (the inbound shipment transportation object), in alternative embodiments the merchants configure the hierarchical inbound shipment order starting from the root node and ending at the leaf node (s).

While embodiments of the invention show an order of operations, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. An apparatus, comprising:
an order fulfillment server device including an interactive hierarchical inbound shipment order configuration tool adapted to receive input from merchants to configure hierarchical inbound shipment orders corresponding with hierarchical inbound shipments respectively for a set of one or more warehouses, wherein each of the hierarchical inbound shipment orders has a plurality of levels including a product level and a plurality of container levels, and wherein the tool is adapted to configure hierarchical inbound shipment orders at least by:
inclusion of, via receipt of merchant input, product type objects in the product level, wherein each product type object represents a physical product type,
inclusion of, via receipt of merchant input, container objects in each of the plurality of container levels, wherein each container object represents a set of one or more physical containers,
creation of, via receipt of merchant input, associations between the product type objects and the container objects, wherein each association between one of the product type objects and one of the container objects represents an amount of the physical product type per the set of physical containers represented by that product type object and that container object respectively,
creation of, via receipt of merchant input, associations between the container objects of a lower level of the hierarchical inbound shipment order and container objects of a higher level of the hierarchical inbound shipment order, wherein each association between one of the container objects of the lower level and one of the container objects of the higher level represents an amount of the set of physical containers of the lower level of the hierarchical inbound shipment per the set of physical containers of the higher level of the hierarchical inbound shipment, and
provision of, via receipt of merchant input an indication of different ones of the container objects as representing shippable container packages, wherein each shippable container package is a physical container that will potentially be shipped to a customer without a modification of the contents of that physical container; and the order fulfillment server device further including a packing list generation module adapted to generate at least one packing list from the configured hierarchical inbound shipment orders for each of the hierarchical inbound shipments, each of the at least one packing lists including a listing of one or more of the shippable container packages in its hierarchical inbound shipment.

2. The apparatus of claim 1, wherein the interactive hierarchical inbound shipment order configuration tool further allows for the following for each of the hierarchical inbound shipment orders in response to received merchant input, indications that different ones of the shippable container packages may be broken down after receipt and processing of the hierarchical inbound shipment as necessary to fulfill future outbound shipping orders.

3. The apparatus of claim 1, wherein the interactive hierarchical inbound shipment order configuration tool is further to allow for the following for each of the hierarchical inbound shipment orders in response to received merchant input, creation of the associations between the product type objects and the container objects responsive to receipt of drag and drop operations of the product type objects onto the container objects, and creation of the associations between the container objects at lower levels of the hierarchical inbound shipment order with the container objects at higher levels responsive to receipt of drag and drop operations of the container objects at lower levels onto the container objects at higher levels.

4. The apparatus of claim 1, further comprising:

a special project interface for the merchants to request special projects of the set of warehouses including requesting that the shippable container packages be broken down and their contents inventoried.

5. The apparatus of claim 1, further comprising:

an inventory module to maintain for the merchants an inventory of each shippable container package and each product within each shippable container package stored in the warehouse.

6. The apparatus of claim 1, wherein each indicated one of the container objects represents each of the set of physical containers represented by that container object being a shippable container package.

7. The apparatus of claim 1, wherein the interactive hierarchical inbound shipment order configuration tool further allows for the following for each of the hierarchical inbound shipment orders:

provision of, via receipt of merchant input, an indication of different ones of the associations between the container objects of the lower level of the hierarchical inbound shipment order and container objects of the higher level of the hierarchical inbound shipment order as representing shippable container packages, wherein each indicated association represents each of the amount of the set of physical containers of the lower level being a shippable container package.

8. The apparatus of claim 1, wherein the packing list generation module is further adapted to generate graphical representations of the hierarchical inbound shipments for the set of warehouses, each graphical representation including for each branch of the hierarchal inbound shipment order a representation of those of the container objects at the highest level of the hierarchical inbound shipment down to a representation of those container objects representing shippable container packages.

9. The apparatus of claim 1, wherein the packing list generation module is further adapted to generate step-by-step instructions for the set of warehouses to handle the hierarchical inbound shipments including instructions for each hierarchical inbound shipment to break down each branch of that hierarchical inbound shipment only to the point of reaching a most immediately earlier one of shippable container packages and physical products.

10. The apparatus of claim 9, wherein the step-by-step instructions for each hierarchical inbound shipment include instructions to defer opening and inventorying one or more of the physical containers of that hierarchical inbound shipment.

11. The apparatus of claim 1, wherein the hierarchical inbound shipment further includes an inbound shipment transportation level, wherein the interactive hierarchical inbound shipment order configuration tool further allows for the following for each of the hierarchical inbound shipment orders:

creation of associations between the container objects and a set of one or more inbound shipment transportation objects of the inbound shipment transportation level, wherein each association between one of the container objects and one of the inbound shipment transportation objects represents an amount of the set of physical containers represented by that container object per a transportation vehicle represented by that inbound shipment transportation object.

12. The apparatus of claim 11, wherein the product type objects are leaf nodes of each hierarchical inbound shipment order, wherein the container objects are intermediary nodes of each hierarchical inbound shipment order, wherein the inbound shipment transportation objects are root nodes of each hierarchical inbound shipment order, and wherein the interactive hierarchical inbound shipment order configuration tool displays to the merchants the leaf nodes at the top of the hierarchy of each hierarchical inbound shipment order and the root node at the bottom of the hierarchy of each hierarchical inbound shipment order.

13. The apparatus of claim 11, wherein the interactive hierarchical inbound shipment order configuration tool further allows for the following for each of the hierarchical inbound shipment orders, creation of associations between the product type objects and the set of inbound shipment transportation objects of the inbound shipment transportation level, wherein each association between one of the product type objects and one of the inbound shipment transportation objects represents an amount of the physical product type represented by that product type object per the transportation vehicle represented by that inbound shipment transportation object.

14. The apparatus of claim 11, wherein the interactive hierarchical inbound shipment order configuration tool displays the individual physical products, the individual physical containers, and the individual transportation vehicles as horizontally collapsed into the product type objects, the container type objects, and the inbound shipment transportation objects.

15. A method for configuring a hierarchical inbound shipment order, comprising:

receiving, at an interactive hierarchical inbound shipment order configuration tool of an order fulfillment server, input from a merchant to configure the hierarchical inbound shipment order which corresponds to a hierarchical inbound shipment to a warehouse, the hierarchical inbound shipment order including a product level and a plurality of container levels;

the interactive hierarchical inbound shipment order configuration tool configuring the hierarchical inbound shipment order by performing at least the following operations:

including, via receipt of merchant input, one or more product type objects in the product level, wherein each product type object represents a physical product type in the hierarchical inbound shipment, including, via receipt of merchant input, one or more container objects in each of the plurality of container levels, wherein each container object represents a set of one or more physical containers in the hierarchical inbound shipment, associating, via receipt of merchant input, each of the one or more product type objects with one or more container objects at a lowest one of the plurality of container levels of the hierarchical inbound shipment order, wherein each association between one of the product type objects to one of the container objects at the lowest level represents an amount of the physical product type per the set of physical containers represented by that product type object and that container object respectively, for each of the plurality of container levels with an exception of a highest one of the plurality of container levels of the hierarchical inbound shipment order, associating, via receipt of merchant input, each container object at that container level to a container object at a higher one of the plurality of container levels of the hierarchical inbound shipment order, wherein each association between container objects represents an amount of the set of physical containers represented by the container object at that container level per the set of physical containers represented by the container object at the higher one of the plurality of container level, and marking, via receipt of merchant input, one or more of the plurality of container objects as representing one or more shippable container packages, wherein each shippable container package is a physical container that will potentially be shipped to a customer without a modification of the contents of that physical container;

automatically generating a packing list for the warehouse based on the configured hierarchical inbound shipment order, the packing list including a listing of one or more of the physical containers that are shippable packages; and communicating the packing list to the warehouse.

16. The method of claim 15, wherein the interactive hierarchical inbound shipment order configuration tool further receives input from the merchant indicating that one or more of the shippable container packages may be broken down after receipt and processing of the hierarchical inbound shipment as necessary to fulfill future outbound shipping orders.

17. The method of claim 15, wherein the interactive hierarchical inbound shipment order configuration tool creates each association between one of the product type objects and one of the container objects responsive to receiving a drag and drop operation of that product type object onto the container object, and each association between one of the container objects at a lower level and one of the container objects at a higher level is created responsive to receiving a drag and drop operation at that container object of the lower level onto the container object of the higher level.

18. The method of claim 15, further comprising:

after the packing list is communicated to the warehouse and after the warehouse has received the hierarchical inbound shipment, receiving a request from the merchant on a special project interface of the order fulfillment server to open one or more shippable packages at the warehouse and inventory their contents;

generating a set of one or more instructions for the warehouse to satisfy the request; and communicating the set of instructions to the warehouse.

19. The method of claim 15, further comprising:

maintaining, on an inventory module of the order fulfillment server for the merchant, an inventory of each shippable container package and each product that is stored in the warehouse.

20. The method of claim 15, wherein each marked one of the container objects represents each of the set of physical containers represented by that container object being a shippable container package.

21. The method of claim 15, further comprising generating a graphical representation of the hierarchical inbound shipment for the warehouse, the graphical representation including for each branch of the hierarchical inbound shipment order a representation of those of the container objects at the highest level of the hierarchical inbound shipment down to a representation of those container objects representing shippable container packages.

22. The method of claim 15, further comprising, generating step-by-step instructions for the warehouse to handle the hierarchical inbound shipment including one or more instructions to break down each branch of the hierarchical inbound shipment only to the point of reaching a most immediately earlier one of the shippable container packages and a physical product.

23. The method of claim 22, wherein the step-by-step instructions include one or more instructions to defer opening and inventorying one or more of the physical containers of the hierarchical inbound shipment.

24. The method of claim 15, wherein the hierarchical inbound shipment further includes an inbound shipment transportation level, wherein the interactive hierarchical inbound shipment order configuration tool further receives input from the merchant causing the tool to perform the following:

associating the one or more container objects of the highest one of the plurality of container levels to an inbound shipment transportation object of the inbound shipment transportation level, wherein each association between one of the container objects of the highest container level and the inbound shipment transportation object represents an amount of the set of physical containers represented by that container object that is included or will be included in a transportation vehicle represented by the inbound shipment transportation object.

25. The method of claim 24, wherein the product type objects are leaf nodes of the hierarchical inbound shipment order, wherein the container objects are intermediary nodes of the hierarchical inbound shipment order, wherein the inbound shipment transportation object is a root node of the hierarchical inbound shipment order, and wherein the interactive hierarchical inbound shipment order configuration tool displays to the merchant the leaf nodes at the top of the hierarchy of the hierarchical inbound shipment order and the root node at the bottom of the hierarchy of the hierarchical inbound shipment order.

26. The method of claim 24, wherein the interactive hierarchical inbound shipment order configuration tool displays the one or more individual physical products, the individual physical containers, and the one or more individual transportation vehicles as horizontally collapsed into the product type objects, the container type objects, and the inbound shipment transportation objects.

27. The method of claim 24, wherein the interactive hierarchical inbound shipment order configuration tool further recieves input that causes the tool to perform the following, associating one or more of the product type objects to the inbound shipment transportation object of the inbound shipment transportation level, wherein each association between one of the product type objects and the inbound shipment transportation object represents an amount of the physical product type represented by that product type object that is included or will be included in the transportation vehicle represented by the inbound shipment transportation object.

* * * * *